(12) United States Patent
Liao et al.

(10) Patent No.: US 11,388,275 B2
(45) Date of Patent: Jul. 12, 2022

(54) ELECTRONIC DEVICE AND CAMERA MOVEMENT ASSEMBLY

(71) Applicant: SAMSUNG ELECTRONICS CO., LTD., Suwon-si (KR)

(72) Inventors: Fangming Liao, Guangzhou (CN); Haitao Yang, Guangzhou (CN); Qiang Liu, Guangzhou (CN); Xing Hu, Guangzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 16/609,129

(22) PCT Filed: Sep. 6, 2019

(86) PCT No.: PCT/KR2019/011579
§ 371 (c)(1),
(2) Date: Oct. 28, 2019

(87) PCT Pub. No.: WO2021/045281
PCT Pub. Date: Mar. 11, 2021

(65) Prior Publication Data
US 2021/0360095 A1    Nov. 18, 2021

(51) Int. Cl.
*H04M 1/02* (2006.01)
*G03B 17/02* (2021.01)
*H04N 5/225* (2006.01)

(52) U.S. Cl.
CPC .......... *H04M 1/0264* (2013.01); *G03B 17/02* (2013.01); *H04N 5/2252* (2013.01); *H04N 5/2253* (2013.01); *H04N 5/2257* (2013.01)

(58) Field of Classification Search
None
See application file for complete search history.

(56) References Cited

U.S. PATENT DOCUMENTS 7,443,439 B2   10/2008   Kim et al.
8,224,179 B2*   7/2012   Lin ........................ G03B 17/02
                                                        396/535
(Continued)

FOREIGN PATENT DOCUMENTS

CN     203984539 U    12/2014
CN     106911883 A     6/2017
(Continued)

OTHER PUBLICATIONS

International Search Report (PCT/ISA/210) dated Jun. 5, 2020 issued by the International Searching Authority in International Application No. PCT/KR2019/011579.
(Continued)

*Primary Examiner* — Cynthia Segura
(74) *Attorney, Agent, or Firm* — Sughrue Mion, PLLC

(57) ABSTRACT

An electronic device according to an embodiment includes a camera movement assembly configured to move a camera module between the inside and the outside of a housing. The camera movement assembly includes a camera connection portion which has a connection part connected to the camera module and is capable of moving between a first position at which the camera module is stored in the housing and a second position at which the camera module protrudes outs of the housing, a push portion which is driven to push the camera connection portion to be moved from the first position to the second position when the camera connection portion is at the first position and is driven to be separated from the camera connection portion when the camera connection portion is at the second position, a restoring member which provides a restoration force to the camera connection portion to return the camera connection portion from the second position to the first position, and a locking portion which restricts a position movement of the camera connection portion when the camera connection portion is at the
(Continued)

second position. When the camera module protrudes out of the housing, the camera connection portion is maintained by the locking portion at the second position, and a space may exist between the camera connection portion and the push portion.

15 Claims, 28 Drawing Sheets

(56) References Cited

U.S. PATENT DOCUMENTS

| | | | |
|---|---|---|---|
| 10,924,643 B2* | 2/2021 | Xu | H04M 1/0264 |
| 2005/0014527 A1* | 1/2005 | Chambers | H04N 5/2354 |
| | | | 455/556.1 |
| 2017/0064166 A1* | 3/2017 | Xiong | H04M 1/0264 |
| 2019/0373141 A1* | 12/2019 | Xu | H04N 5/23216 |
| 2020/0336575 A1* | 10/2020 | Li | F16M 11/18 |

FOREIGN PATENT DOCUMENTS

| | | |
|---|---|---|
| CN | 206481344 U | 9/2017 |
| KR | 10-2005-0092202 A | 9/2005 |
| KR | 10-2006-0055217 A | 5/2006 |
| KR | 10-0824358 B1 | 4/2008 |
| KR | 10-2019-0038756 A | 4/2019 |

OTHER PUBLICATIONS

Written Opinion (PCT/ISA/237) dated Jun. 5, 2020 issued by the International Searching Authority in International Application No. PCT/KR2019/011579.

* cited by examiner

ELECTRONIC DEVICE AND CAMERA MOVEMENT ASSEMBLY

TECHNICAL FIELD

An electronic device according to various embodiments of the present disclosure relates to a camera movement assembly.

BACKGROUND ART

With the continuous development of electronic devices and an increase in user experience, a full screen type of maximizing a display area in an electronic device has been actively researched and developed. However, due to the existence of a camera module, in particular, the existence of a front camera module facing a user, there is a limit in increasing a screen rate of a display area to an overall size of an electronic device.

Recently, an electronic device having a structure in which a camera module is hidden under a display area when the camera module is not used and the camera module protrudes outside the display area only when the camera module is in use has been developed. Accordingly, the screen rate of an electronic device may be increased, and thus aesthetic exterior of the electronic device may be much improved.

DESCRIPTION OF EMBODIMENTS

Technical Problem

In an electronic device with a camera module that is moved to be drawn out, a drawing-out speed of the camera module may be too fast or the camera module may not be drawn back into the electronic device by manually pushing the camera module. Accordingly, when an impact is applied to the camera module in a protruding state, the camera module or a structure to move the camera module may be damaged, which causes reduction of the life of the electronic device.

According to an embodiment, provided are an electronic device, in which a camera module may be moved between the inside and the outside of the electronic device and the camera module may be manually drawn back, and a camera movement assembly therefor.

According to an embodiment, provided are an electronic device capable of automatically drawing a camera module back, and a camera movement assembly therefor.

Solution to Problem

According to an embodiment, an electronic device includes a housing, a camera module, and a camera movement assembly for moving the camera module between the inside and the outside of the housing, wherein the camera movement assembly includes:

a camera connection portion which has a connection part connected to the camera module and is capable of moving between a first position at which the camera module is stored in the housing and a second position at which the camera module protrudes outs of the housing;

a push portion which is driven to push the camera connection portion to be moved from the first position to the second position when the camera connection portion is at the first position and is driven to be separated from the camera connection portion when the camera connection portion is at the second position;

a restoring member which provides a restoration force to the camera connection portion to return the camera connection portion from the second position to the first position; and a locking portion which restricts a position movement of the camera connection portion when the camera connection portion is at the second position, wherein, when the camera module protrudes out of the housing, the camera connection portion is maintained by the locking portion at the second position, and a space exists between the camera connection portion and the push portion, and wherein, when the camera connection portion is located at the second position, a height of the space is equal to or greater than ½ of a protrusion height of the camera module.

The push portion may be rotatable in a first direction and a second direction that is opposite to the first direction, when the camera connection portion is at the first position, the push portion may rotate in the first direction and push the camera connection portion to move from the first position to the second position, and when the camera connection portion is at the second position, the push portion may rotate in the second direction to be separated from the camera connection portion which is maintained by the locking portion at the second position.

The push portion may have a first press surface facing the camera connection portion, and the camera connection portion may have a second press surface facing the first press surface.

The push portion may include a protruding portion protruding toward the camera connection portion, wherein the first press surface is disposed at at least one side of the protruding portion, and the camera connection portion may include a recess portion into which the protruding portion is inserted, wherein the second press surface is disposed at at least one side of the recess portion.

When the camera connection portion is located at the second position, the push portion may rotate in the second direction such that the protruding portion is aligned with the recess portion of the camera connection portion in a movement direction of the camera connection portion.

The electronic device may further include a drive module configured to provide a driving force to the push portion and a deceleration gear portion disposed between the drive module and the push portion, wherein the deceleration gear portion comprises a planetary gear row.

When the camera connection portion is located at the second position, the locking portion may press the camera connection portion in a direction crossing a movement direction of the camera connection portion.

The locking portion may remove a movement restriction of the camera connection portion according to a rotation of the push portion.

The locking portion include a position restriction protrusion which presses a side surface of the camera connection portion, a position restoration member which presses a side surface of the push portion, and a connecting rod which connects the position restriction protrusion to the position restoration member and rotates around a rotation axis.

A position restriction recess into which the position restriction protrusion is inserted may be provided at the side surface of the camera connection portion, and a position restoration recess into which the position restoration member is inserted may be provided in a partial region in a circumferential direction in a side surface of the push portion, the electronic device further including an elastic member which provides an elastic force to the position restoration member so that the position restoration member presses a side surface of the push portion.

The push portion may be rotatable around a rotation axis coaxial with a movement direction of the camera connection portion.

The electronic device may further include a gravity sensor and a controller configured to remove a movement restriction of the camera connection portion by the locking portion based on a result of the detection by the sensor The push portion may linearly move in a direction crossing a movement direction of the camera connection portion.

The connection part may be integrally formed with the camera connection portion

The electronic device may further include a sensor configured to detect falling of the electronic device and a controller configured to move the camera module to be stored in the housing based on a result of the detection by the sensor.

The controller may further configured to move the camera module by removing a movement restriction of the camera connection portion by the locking portion based on the result of the detection by the sensor.

According to an embodiment, an electronic device includes a housing, functional modules, and functional module movement assemblies for moving the functional modules between the inside and the outside of the housing, wherein the functional module movement assemblies include:

functional module connection portions which have a connection part connected to the functional modules, and which is capable of moving between a first position at which the functional modules are stored in the housing and a second position at which the functional modules protrude outs of the housing;

a push portion which is driven to push the functional module connection portions to be moved from the first position to the second position when the functional module connection portions are at the first position, and which is driven to be separated from the functional module connection portions when the functional module connection portions are at the second position;

a restoring member which provides a restoration force to the functional module connection portions to return the functional module connection portions from the second position to the first position; and a locking portion which restricts position movements of the functional module connection portions when the functional module connection portions are at the second position, wherein, when the functional modules protrude out of the housing, the functional module connection portions are maintained by the locking portion at the second position, and a space exists between the functional module connection portions and the push portion.

The push portion may be rotatable in a first direction and a second direction that is opposite to the first direction, when the functional module connection portions are at the first position, the push portion may rotate in the first direction and push the functional module connection portions to move from the first position to the second position, and when the functional module connection portions are at the second position, the push portion may rotate in the second direction to be separated from the functional module connection portions which are maintained by the locking portion at the second position.

The push portion may have a first press surface facing the functional module connection portions, and the functional module connection portions may have a second press surface facing the first press surface. The push portion may include a protruding portion protruding toward the functional module connection portions, wherein the first press surface is disposed at at least one side of the protruding portion, and the functional module connection portions may include a recess portion into which the protruding portion is inserted, wherein the second press surface is disposed at at least one side of the recess portion.

When the functional module connection portions are located at the second position, the push portion may rotate in the second direction such that the protruding portion is aligned with the recess portion of the functional module connection portions in a movement direction of the functional module connection portions.

According to an embodiment, a camera movement assembly for moving a camera module between the inside and the outside of a housing includes a camera connection portion which has a connection part connected to the camera module and is capable of moving between a first position at which the camera module is stored in the housing and a second position at which the camera module protrudes outs of the housing;

a push portion which is driven to push the camera connection portion to be moved from the first position to the second position when the camera connection portion is at the first position and is driven to be separated from the camera connection portion when the camera connection portion is at the second position;

a restoring member which provides a restoration force to the camera connection portion to return the camera connection portion from the second position to the first position; and a locking portion which restricts a position movement of the camera connection portion when the camera connection portion is at the second position, wherein, when the camera module protrudes out of the housing, the camera connection portion is maintained by the locking portion at the second position, and a space exists between the camera connection portion and the push portion.

Advantageous Effects of Disclosure

An electronic device according to an embodiment and a camera movement assembly therefor may enable a camera module to move between the inside and the outside of the electronic device and also the camera module to be manually drawn back.

An electronic device according to an embodiment and a camera movement assembly therefor may quickly and automatically draw a camera module back.

MODE OF DISCLOSURE

Figure 1:
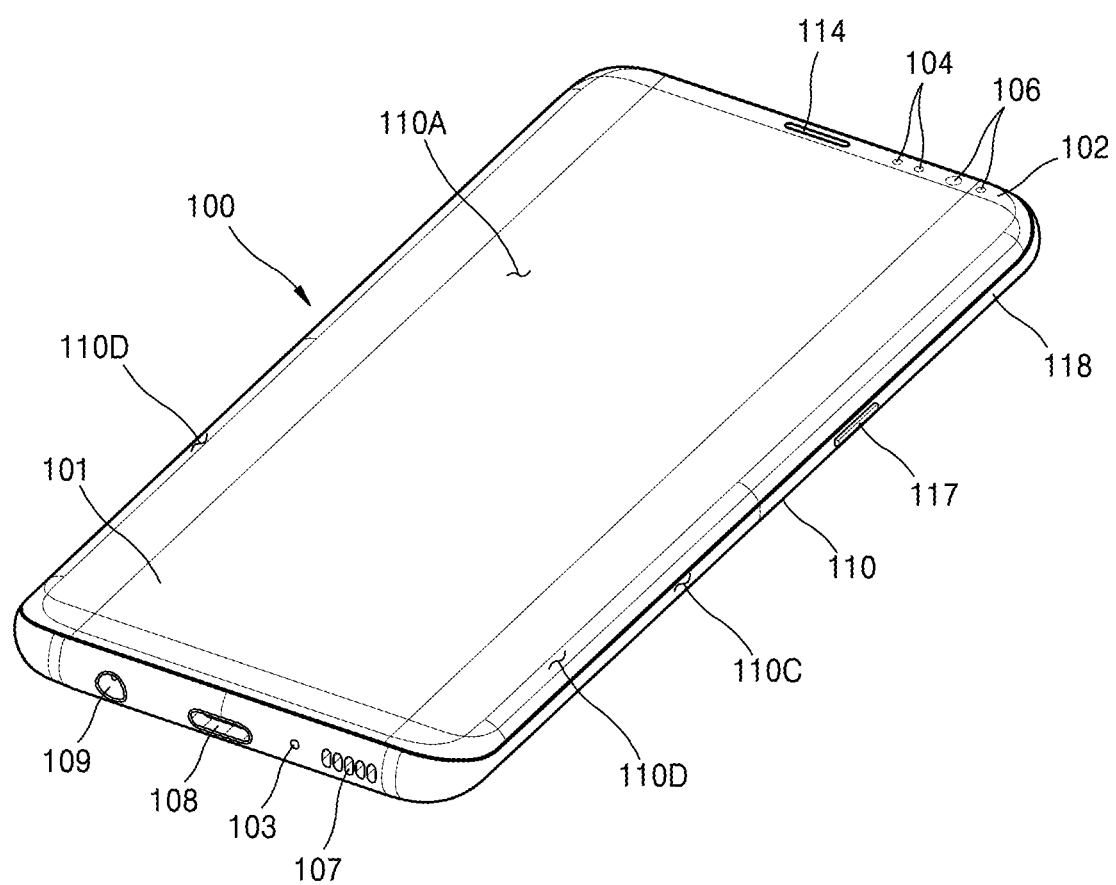
FIG. 1 is a front perspective view of a mobile electronic device according to an embodiment.

Hereinafter, the configuration and operation of the disclosure are described in detail through embodiments of the accompanying drawings.

The terms used in the present specification are briefly explained and the present disclosure is described in detail.

The terms used in the present disclosure have been selected from currently widely used general terms in consideration of the functions in the present disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the present disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements.

Furthermore, terms such as "first" and "second" are used herein merely to describe a variety of constituent elements, but the constituent elements are not limited by the terms. Such terms are used only for the purpose of distinguishing one constituent element from another constituent element.

Embodiments are provided to further completely explain the present disclosure to one of ordinary skill in the art to which the present disclosure pertains. However, the present disclosure is not limited thereto and it will be understood that various changes in form and details may be made therein without departing from the spirit and scope of the following claims. In the drawings, a part that is not related to a description is omitted to clearly describe the present disclosure and, throughout the specification, similar parts are referenced with similar reference numerals.

Figure 2:
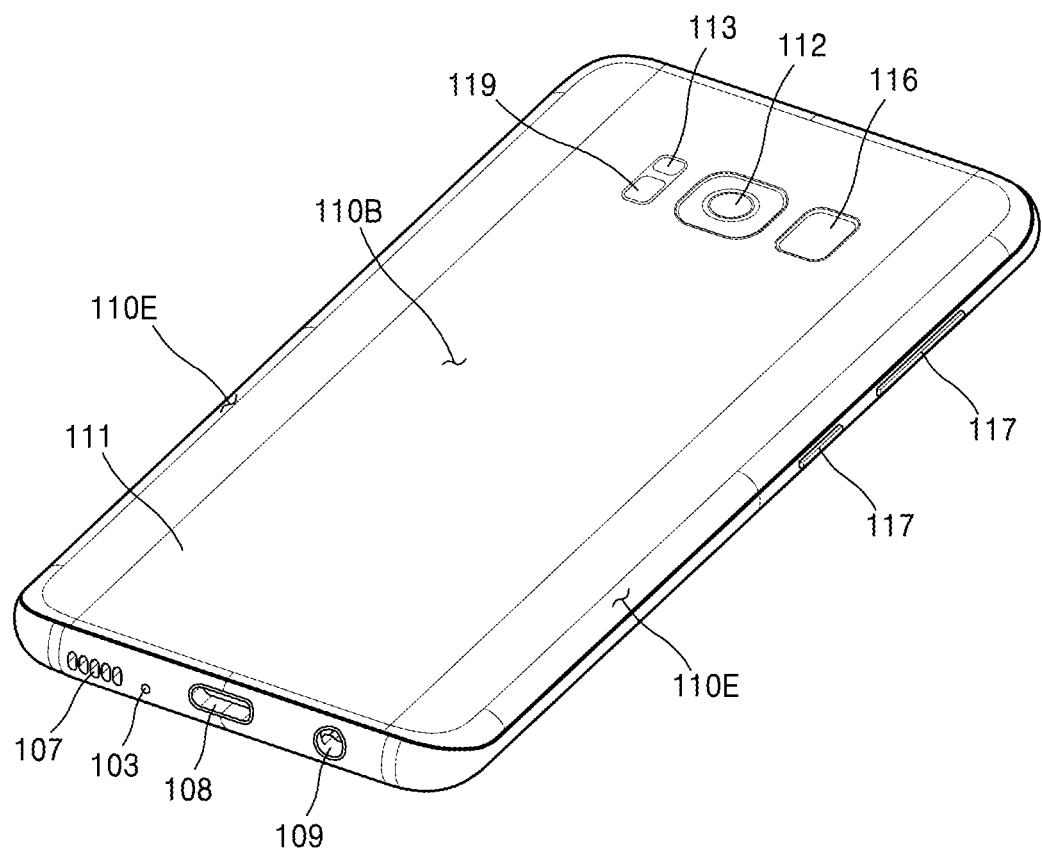
FIG. 2 is a rear perspective view of the electronic device of FIG. 1.

Referring to FIGS. 1 and 2, an electronic device 100 according to an embodiment may include a housing 110 including a first surface or a front surface 110A, a second surface or a rear surface 110B, and a side surface 110C surrounding a space between the first surface 110A and the second surface 110B. In another embodiment (not shown), the housing 110 may refer to a structure forming a part of the first surface 110A, the second surface 110B, and the side surface 110C of FIG. 1. According to an embodiment, the first surface 110A may include a front plate 102 that is substantially at least partially transparent, for example, a glass plate or a polymer plate including various coating layers. The second surface 110B may be formed by a rear plate 111 that is substantially opaque. The rear plate 111 may include, for example, coating or colored glass, ceramic, a polymer, metal, for example, aluminum, stainless steel STS, or magnesium, or a combination of at least two of the above materials. The side surface 110C is combined with the front plate 102 and the rear plate 111, and may have a side surface bezel structure (or "side surface member") 118 having metal and/or a polymer. In some embodiments, the rear plate 111 and the side surface bezel structure 118 may be formed integrally and may include the same material, for example, a metal material such as aluminum.

In the illustrated embodiment, the front plate 102 may include two the first regions 110D at both long edge ends of the front plate 102 by extending seamlessly from the first surface 110A to bend toward the rear plate 111. In the illustrated embodiment (see FIG. 2), the rear plate 111 may include two second regions 110E at both long edge ends of the front plate 102 by extending seamlessly from the second surface 110B to bend toward the front plate 102I. In some embodiments, the front plate 102 (or the rear plate 111) may include only one of the first regions 110D (or the second regions 110E). In another embodiment, a part of the first regions 110D or the second regions 110E may not be included. In the embodiments, when viewed from a side surface of the electronic device 100, the side surface bezel structure 118 may have a first thickness (or width) at a side surface that does not include the first regions 110D or the second regions 110E and a second thickness, which is thinner than the first thickness, at a side surface including the first regions 110D or the second regions 110E.

According to an embodiment, the electronic device 100 may include at least one of a display 101, audio modules 103, 107, and 114, sensor modules 104, 116, and 119, camera modules 105, 112, and 113, a key input device 117, a light-emitting device 106, and connector holes 108 and 109. In some embodiments, the electronic device 100 may not include at least one of the elements, for example, the key input device 117 or the light-emitting device 106, or may additionally include another element.

The display 101 may be exposed through, for example, a considerable portion of the front plate 102. In some embodiments, at least a part of the display 101 may be exposed through the first surface 110A and the front plate 102 forming the first regions 110D of the side surface 110C. In some embodiments, the edge of the display 101 may be formed to be substantially the same as the shape of an adjacent outer edge of the front plate 102. In another embodiment (not shown), to extend the exposure area of the display 101, an interval between the outer edge of the display 101 and the outer edge of the front plate 102 may be formed to be substantially constant.

In another embodiment (not shown), a recess or opening may be formed in a part of an image display area of the display 101, and at least one of the audio module 114, the sensor module 104, and the light-emitting device 106, which are aligned with the recess or the opening, may be included in the electronic device 100. In another embodiment (not shown), at least one of the audio module 114, the sensor module 104, a camera module 105, a fingerprint sensor 116, and the light-emitting device 106 may be included in a rear surface of the image display area of the display 101. In another embodiment (not shown), the display 101 may be coupled to or disposed adjacent to a touch sensing circuit, a pressure sensor for measuring pressure of a touch, and/or a digitizer for detecting a stylus pen of a magnetic field type. In some embodiments, at least a part of the sensor modules 104 and 119, and/or at least a part of the key input device 117, may be disposed in the first regions 110D and/or the second regions 110E.

The audio modules 103, 107, and 114 may include the microphone hole 103 and the speaker holes 107 and 114. A microphone for acquiring external sound may be disposed in the microphone hole 103, and in some embodiments, a plurality of microphones may be disposed to detect the direction of sound. The speaker holes 107 and 114 may include the external speaker hole 107 and the call receiving hole 114. In some embodiments, the speaker holes 107 and 114 and the microphone hole 103 may be implemented as one hole, or may include a speaker, for example, a piezo speaker, without the speaker holes 107 and 114.

The sensor modules 104, 116, and 119 may generate an electrical signal or data value corresponding to an internal operation state or an external environment state of the electronic device 100. The sensor modules 104, 116, and 119 may include, for example, the first sensor module 104, for example, a proximity sensor, and/or a second sensor module (not shown), for example, a fingerprint sensor, which are disposed on the first surface 110A of the housing 110, and/or the third sensor module 119, for example, an HRM sensor, and/or the fourth sensor module 116, for example, a fingerprint sensor, which are disposed on the second surface 110B of the housing 110. The fingerprint sensor may be disposed not only on the first surface 110A of the housing 110, for example, the display 101, but also on the second surface 110B. The electronic device 100 may include at least one of sensor modules (not shown), for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, and an illuminance sensor.

The camera modules 105, 112, and 113 may include a first camera module 105 (see FIG. 5) disposed inside the electronic device 100 and a second camera module 112 and/or a flash 113 which are disposed on the second surface 110B. The camera modules 105 and 112 may include one or a plurality of lenses, an image sensor, and/or an image signal processor. The flash 113 may include, for example, a light-emitting diode or a xenon lamp. In some embodiments, two or more lenses (an IR camera, a wide angle and telephoto lens) and image sensors may be disposed on one surface of the electronic device 100.

The key input device 117 may be disposed on the side surface 110C of the housing 110. In another embodiment, the electronic device 100 may not include some or the entirety of the above-described key input device 117 and the key input device 117 that is not included may be implemented in another form such as a soft key on the display 101. In some embodiments, the key input device may include the sensor module 116 disposed on the second surface 110B of the housing 110.

The light-emitting device 106 may be disposed, for example, on the first surface 110A of the housing 110. The light-emitting device 106 may provide, for example, state information of the electronic device 100, in the form of light. In another embodiment, the light-emitting device 106 may provide, for example, a light source linked with the operation of the camera module 105. The light-emitting device 106 may include, for example, an LED, an IR LED, and a xenon lamp.

The connector holes 108 and 109 may include the first connector hole 108 for accommodating a connector, for example, a USB connector, for transceiving electric power and/or data with an external electronic device, and/or the second connector hole 109, for example, an earphone jack, for accommodating a connector for transceiving an audio signal with an external electronic device.

Figure 3:
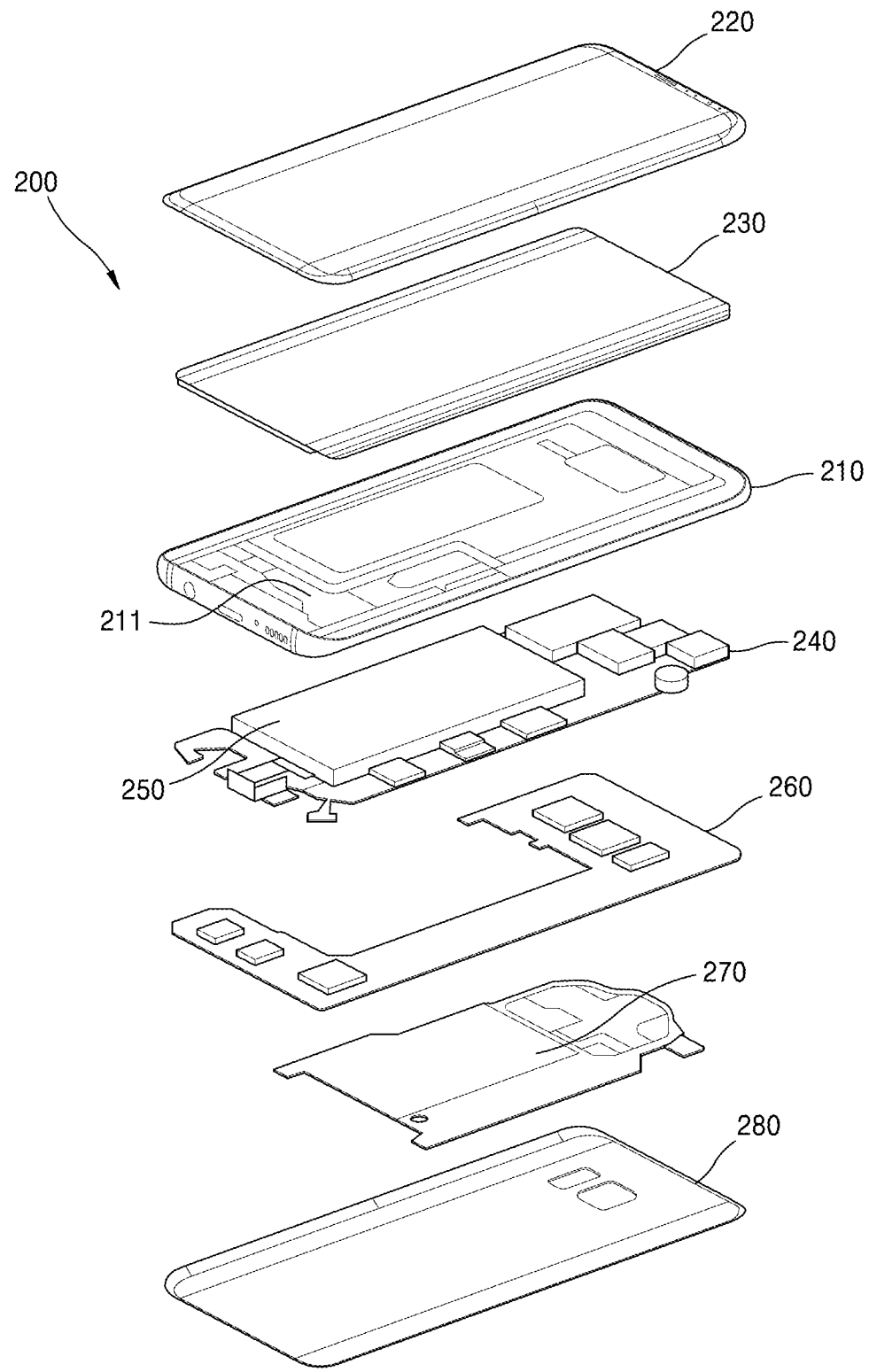
FIG. 3 is an exploded perspective view of the electronic device of FIG. 1.

Referring to FIG. 3, an electronic device 200 may include a side surface bezel structure 210, a first support member 211, for example, a bracket, a front plate 220, a display 230, a printed circuit board 240, a battery 250, a second support member 260, for example, a rear case, an antenna 270, and a rear plate 280. In some embodiments, the electronic device 200 may not include at least one of the elements, for example, the first support member 211 or the second support member 260, or may additionally include another element. The at least one of the elements of the electronic device 200 may be the same as or similar to the at least one of the elements of the electronic device 100 of FIG. 1 or 2, and a redundant description thereof is omitted.

The first support member 211 may be disposed inside the electronic device 200 and connected to the side surface bezel structure 210, or may be integrally formed with the side surface bezel structure 210. The first support member 211 may include a material, for example, a metal material and/or a non-metal material such as a polymer. The display 230 may be coupled to one surface of the first support member 211 and the printed circuit board 240 may be coupled to the other surface thereof. A processor, a memory, and/or an interface may be mounted on the printed circuit board 240. The processor may include one or more of, for example, a central processing unit, an application processor, a graphics processing unit, an image signal processor, a sensor hub processor, or a communication processor.

The memory may include, for example, a volatile memory or a non-volatile memory.

The interface may include, for example, a high definition multimedia interface (HDMI), a universal serial bus (USB) interface, an SD card interface, and/or an audio interface. The interface may electrically or physically connect, for example, the electronic device 200, to an external electronic device and may include a USB connector, an SD card/MMC connector, or an audio connector.

The battery 250, which is an apparatus for supplying electric power to at least one of the elements of the electronic device 200, may include, for example, non-rechargeable primary cells, rechargeable secondary cells, or fuel cells. At least a part of the battery 250 may be disposed, for example, on the substantially same plane as the printed circuit board 240. The battery 250 may be integrally disposed inside the electronic device 200 and may be disposed to be detachable from the electronic device 200.

The antenna 270 may be disposed between the rear plate 280 and the battery 250. The antenna 270 may include, for example, a near field communication (NFC) antenna, a wireless charging antenna, and/or a magnetic secure transmission (MST) antenna. The antenna 270 may perform, for example, a short-range communication with and external apparatus or may wirelessly transceive electric power needed for charging. In another embodiment, an antenna structure may be formed by parts or a combination of the side surface bezel structure 210 and/or the first support member 211.

Figure 4:
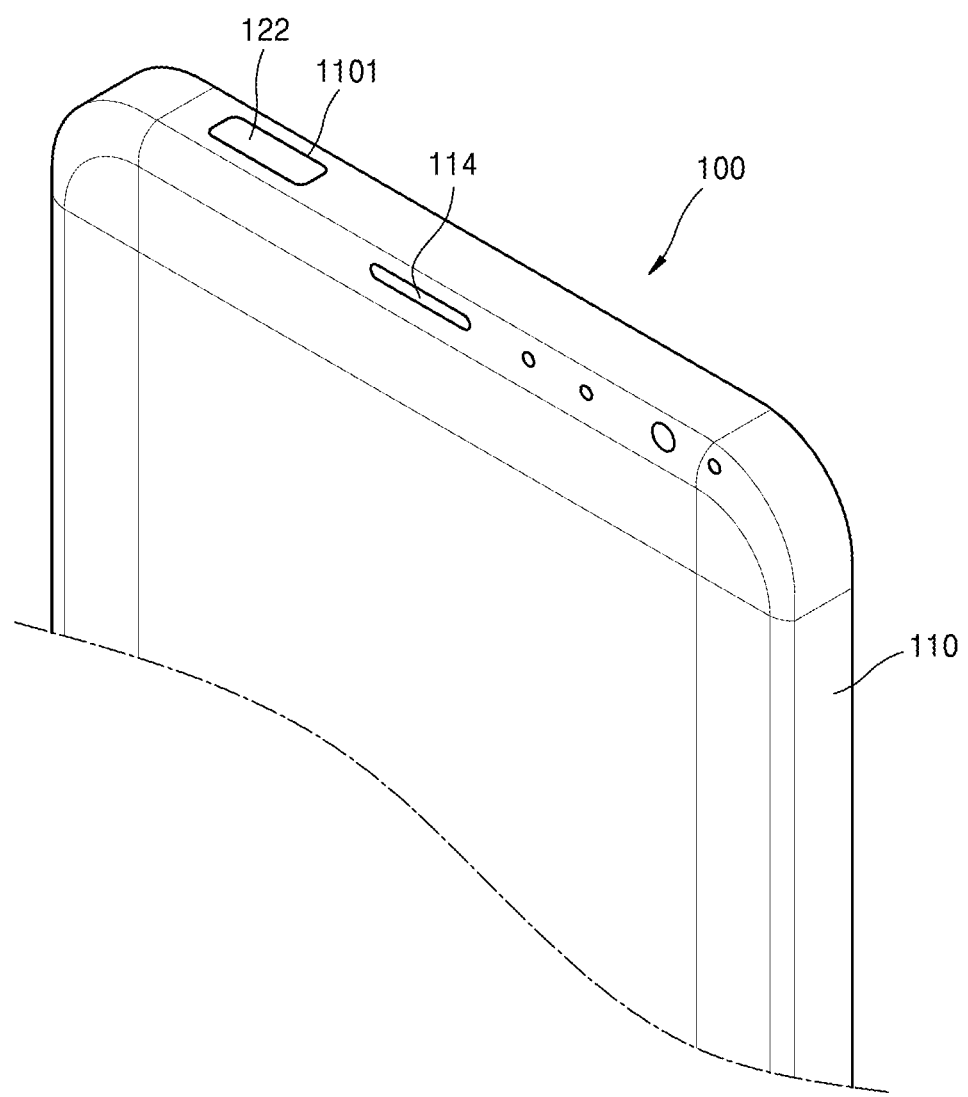
FIG. 4 is a schematic perspective view of a part of an electronic device according to an embodiment.
Figure 5:
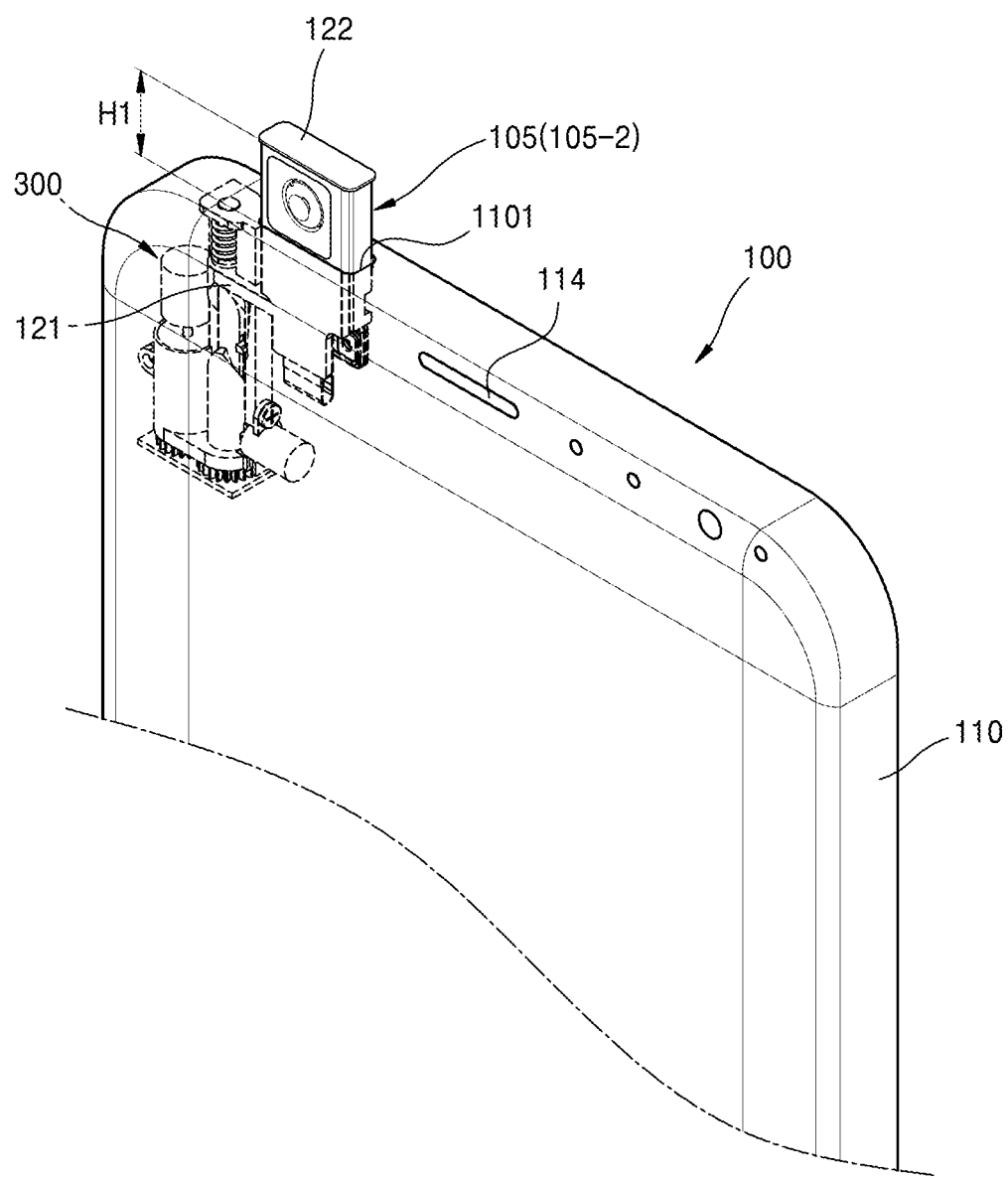
FIG. 5 is a schematic perspective view of a camera movement assembly in an electronic device according to an embodiment and a camera module drawn to the outside by the camera movement assembly.

FIG. 4 is a schematic perspective view of a part of the electronic device 100 according to an embodiment. FIG. 5 is a schematic perspective view of a camera movement assembly 300 in the electronic device 100 according to an embodiment and the camera module 105 drawn to the outside by the camera movement assembly 300.

Referring to FIGS. 4 and 5, the electronic device 100 may include the housing 110, the camera movement assembly 300, and the camera module 105 drawn to the outside by the camera movement assembly 300.

The electronic device 100 may have a structure of storing the camera module 105 inside the housing 110 and drawing the camera module 105 out of the housing 110 for photographing.

To this end, the electronic device 100 is provided with an opening 1101 in one surface or one side of the housing 110. The camera module 105 may be moved by the camera movement assembly 300 and may protrude out of the electronic device 100 through the opening 1101. The camera module 105 may be stored in the housing 110 by applying an external force directly to the camera module 105 or by the operation of the camera movement assembly 300.

The camera module 105 is connected to the camera movement assembly 300. The camera module 105 may be fixedly connected to the camera movement assembly 300 via a bracket 121. However, the connection of the camera module 105 and the camera movement assembly 300 is not limited thereto, and the camera module 105 may be directly connected to the camera movement assembly 300.

A cover 122 corresponding to the opening 1101 of the housing 110 is provided at an end portion of the camera module 105. When the camera module 105 is drawn into the housing 110, the cover 122 forms the exterior of the electronic device 100.

Figure 6:
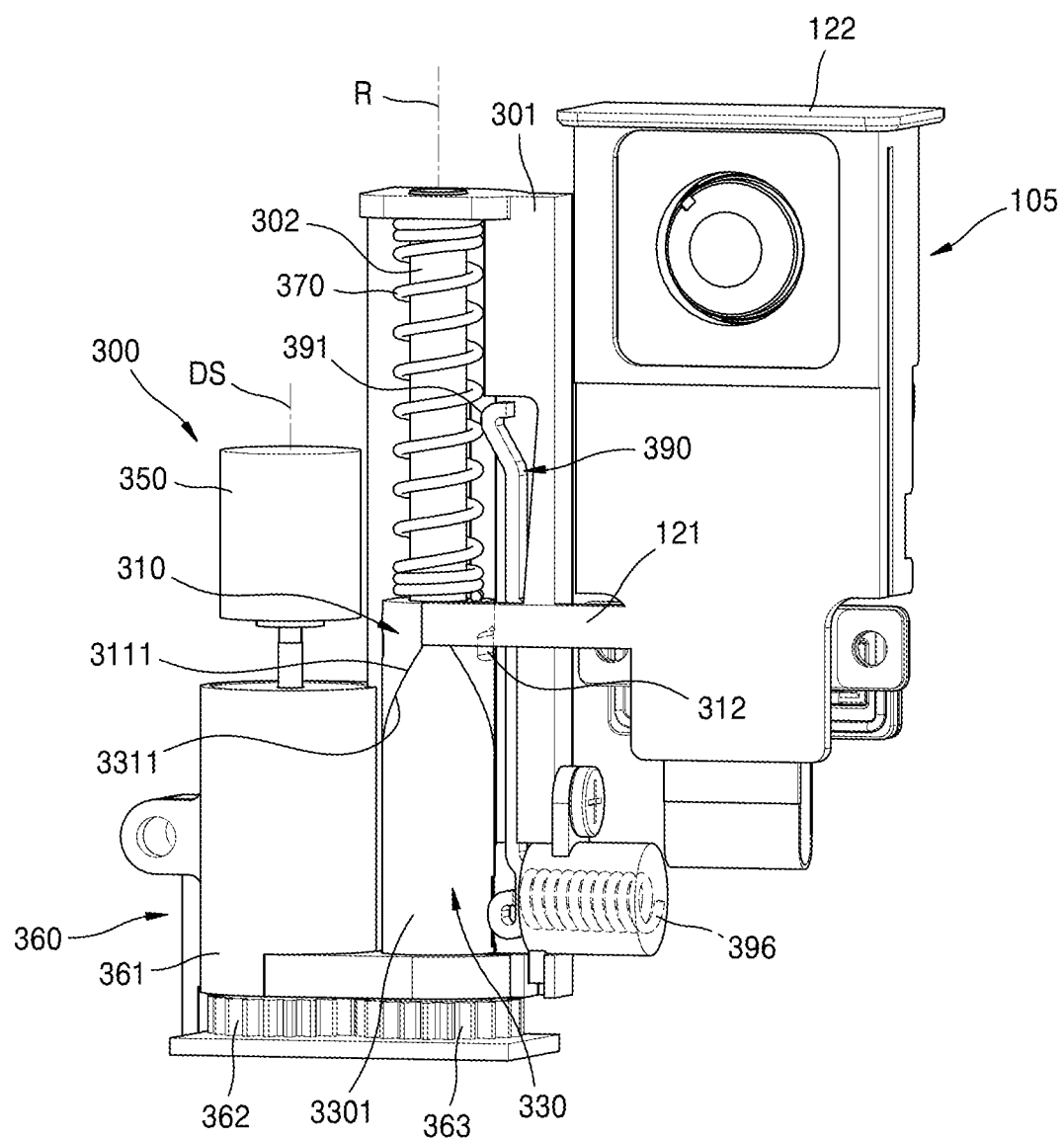
FIGS. 6 and 7 are respectively an assembled perspective view and a disassembled perspective view of a camera movement assembly according to an embodiment.
Figure 7:
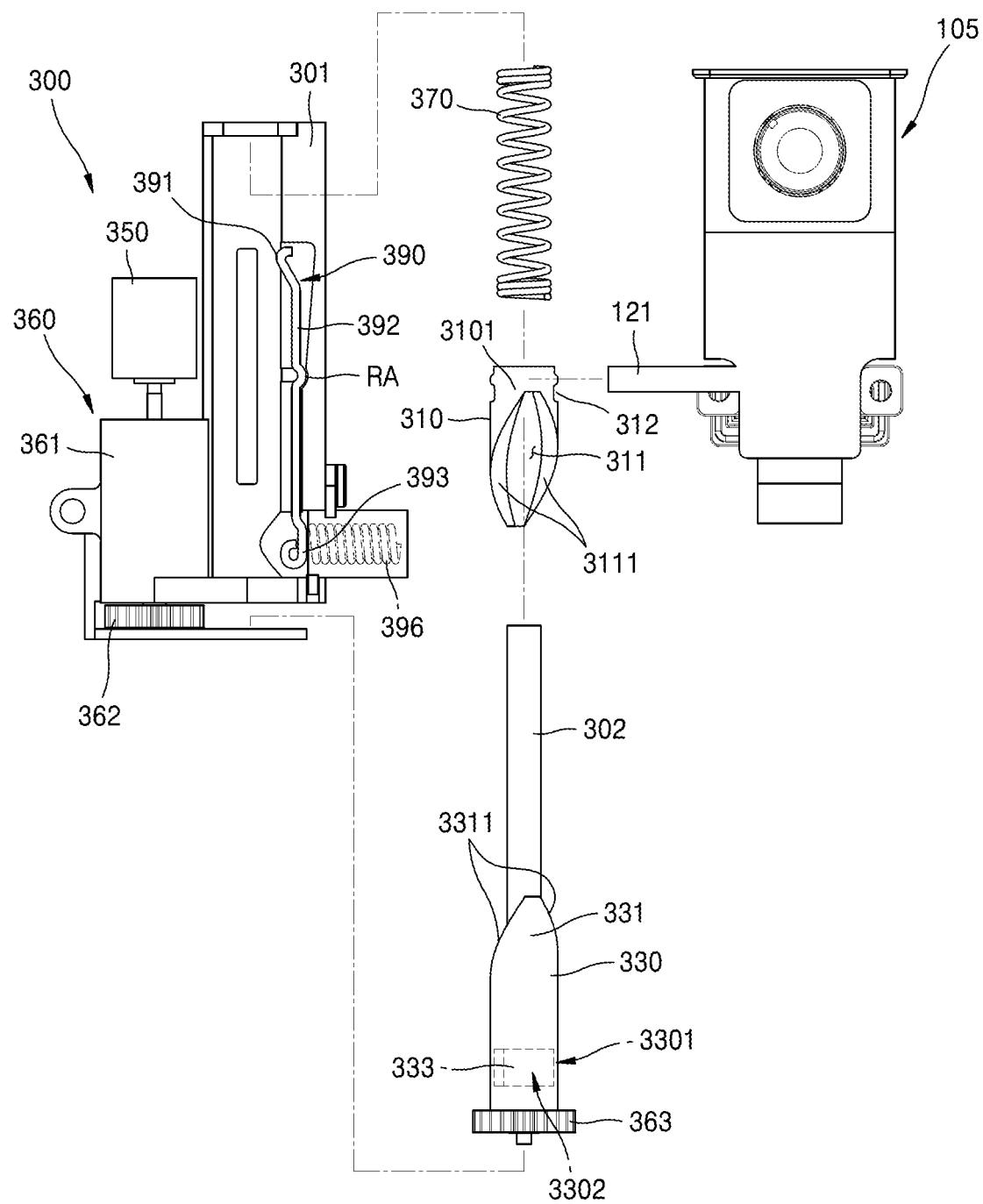

FIGS. 6 and 7 are respectively an assembled perspective view and a disassembled perspective view of a camera movement assembly 300 according to an embodiment. FIG. 6 illustrates the camera movement assembly 300 when the camera module 105 is located inside the housing 110.

Referring to FIGS. 5 to 7, the camera movement assembly 300 according to an embodiment may be connected to the camera module 105 and may draw the camera module 105 out of the housing 110 or into the housing 110.

The camera movement assembly 300 may include a camera connection portion 310 having a connection part 3101 connected to the camera module 105, a push portion 330 for moving the camera connection portion 310 by pressing the camera connection portion 310, a drive module 350 for providing a driving force to the push portion 330, a restoring member 370 for providing a restoration force to the camera connection portion 310 in a direction opposite to a direction in which the force by the push portion 330 is applied, and a locking portion 390 for restricting a movement of the camera connection portion 310. The camera movement assembly 300 may further include a controller (not shown) for controlling the operation of the push portion 330.

The connection part 3101 may be integrally formed with the camera connection portion 310. However, the configuration of the connection part 3101 and the camera connection portion 310 is not necessarily limited thereto, and as necessary, the connection part 3101 and the camera connection portion 310 may be fixedly connected to each other as separate elements.

The camera connection portion 310 may be movably installed in the housing 110. For example, the camera connection portion 310 may be installed on a base 301 that is fixedly installed in the housing 110 to be movable in a direction parallel to an entrance direction (or a movement direction) of the camera module 105. For example, a guide shaft 302 extending in a direction parallel to the movement direction of the camera module 105 is disposed on the base 301, and the camera connection portion 310 is installed to slidably move along the guide shaft 302.

The camera connection portion 310 is connected to the camera module 105 and fixed thereto. Accordingly, the camera connection portion 310 and the camera module 105 may move together.

Figure 8:
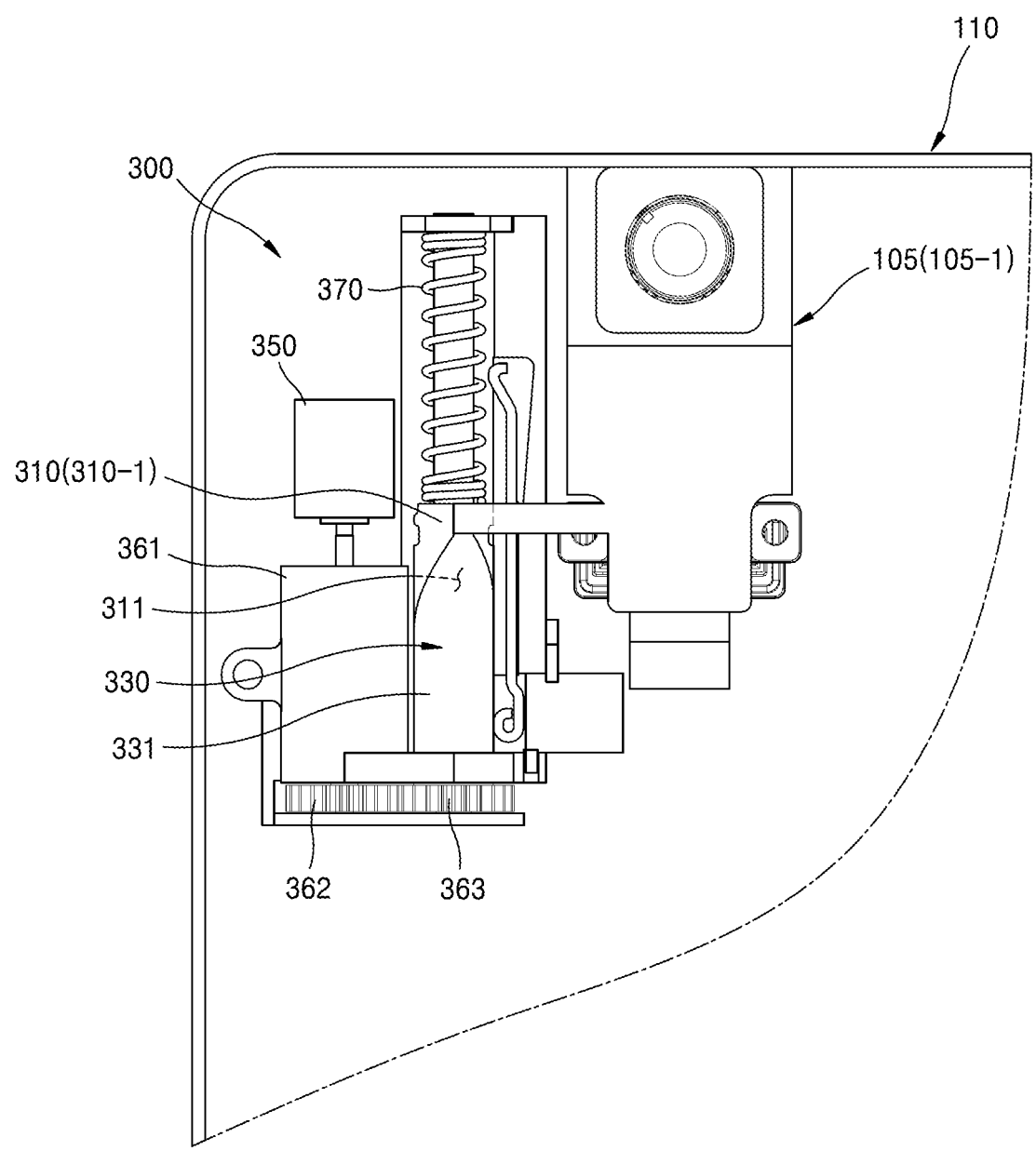
FIG. 8 illustrates the camera module and the camera movement assembly when the camera module is at a stored position.
Figure 9:
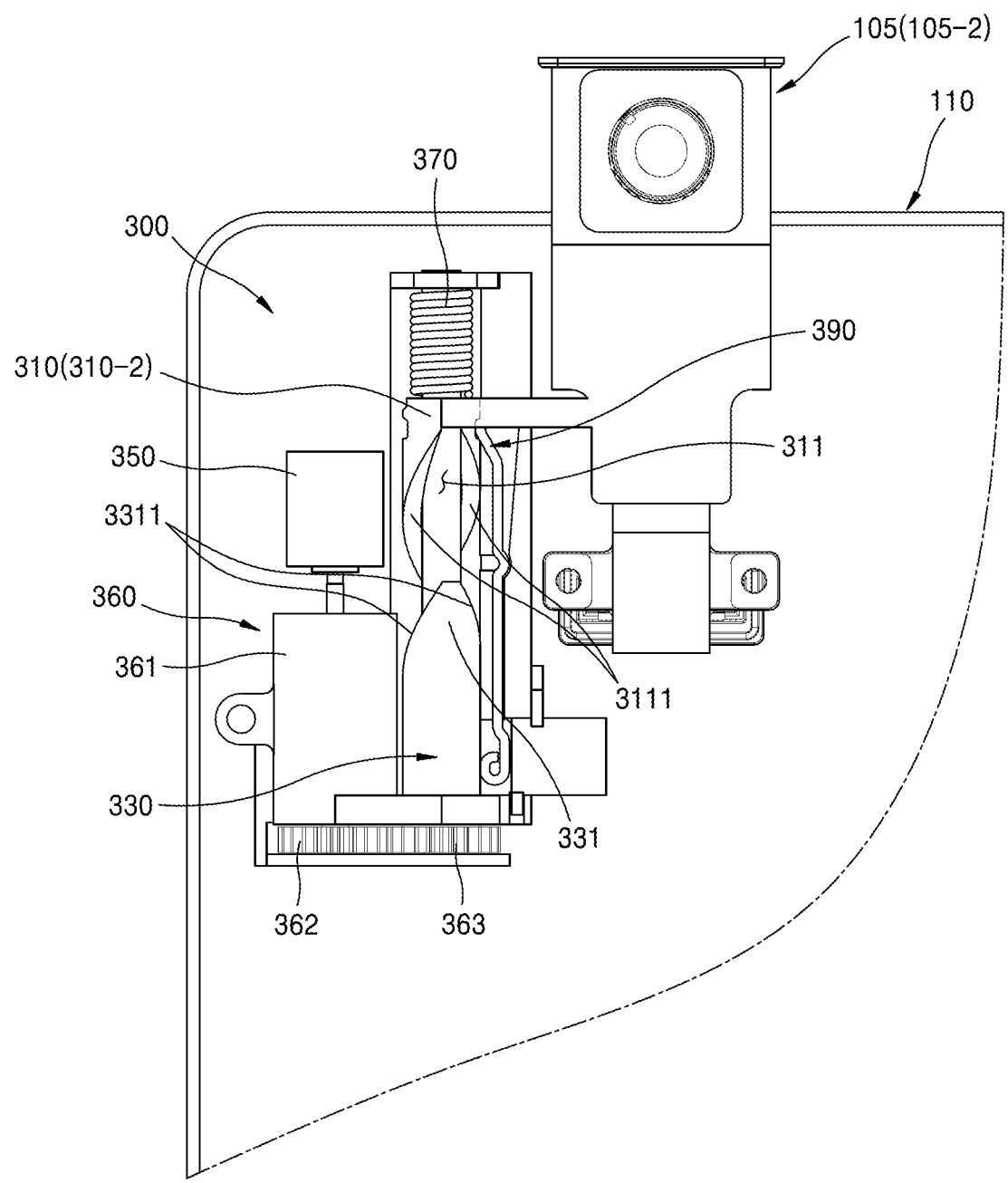
FIG. 9 illustrates the camera module and the camera movement assembly when the camera module is at a protruding position.

FIG. 8 illustrates the camera module 105 and the camera movement assembly 300 when the camera module 105 is at a stored position 105-1. FIG. 9 illustrates the camera module 105 and the camera movement assembly 300 when the camera module 105 is at a protruding position 105-2.

Referring to FIG. 8, when the camera module 105 is located at the stored position 105-1 at which the camera module 105 is stored in the housing 110, the camera connection portion 310 is located at a first position 310-1. Referring to FIG. 9, when the camera module 105 is located at the protruding position 105-2 at which the camera module 105 protrudes out of the housing 110, the camera connection portion 310 is located at a second position 310-2.

Referring to FIGS. 5 to 9, the push portion 330 may be configured to push the camera connection portion 310 connected to the camera module 105 so that the camera module 105 may protrude out of the housing 110.

In an example, the push portion 330 is rotatable and may include a cam having a cylindrical structure. The push portion 330 may include a first press surface 3311 corresponding to the camera connection portion 310. The first press surface 3311 may have a shape inclined to the movement direction of the camera connection portion 310.

The camera connection portion 310 may have a second press surface 3111 corresponding to the push portion 330. The second press surface 3111 may have a shape corresponding to the first press surface 3311. The second press surface 3111 may be inclined to the movement direction of the camera connection portion 310.

The push portion 330, when rotating in a first direction, for example, a counterclockwise direction, pushes the camera connection portion 310 to move from the first position 310-1 to the second position 310-2. A detailed description thereof is presented in a description of FIG. 12A.

When the camera connection portion 310 is at the second position 310-2, the camera connection portion 310 may be maintained at the position by the locking portion 390. Accordingly, the push portion 330 may be driven independently of the operation of the camera connection portion 310. For example, the push portion 330 may be driven to be separated from the camera connection portion 310 that is maintained at the second position 310-2. A detailed description thereof is presented in a description of FIGS. 12C and 12D.

The push portion 330 may include a protruding portion 331 protruding toward the camera connection portion 310. The first press surface 3311 may be disposed at both side portions of the protruding portion 331.

The camera connection portion 310 may include a recess portion 311 corresponding to the protruding portion 331 of the push portion 330, and the second press surface 3111 may be disposed at both side portions of the recess portion 311.

Figure 10:
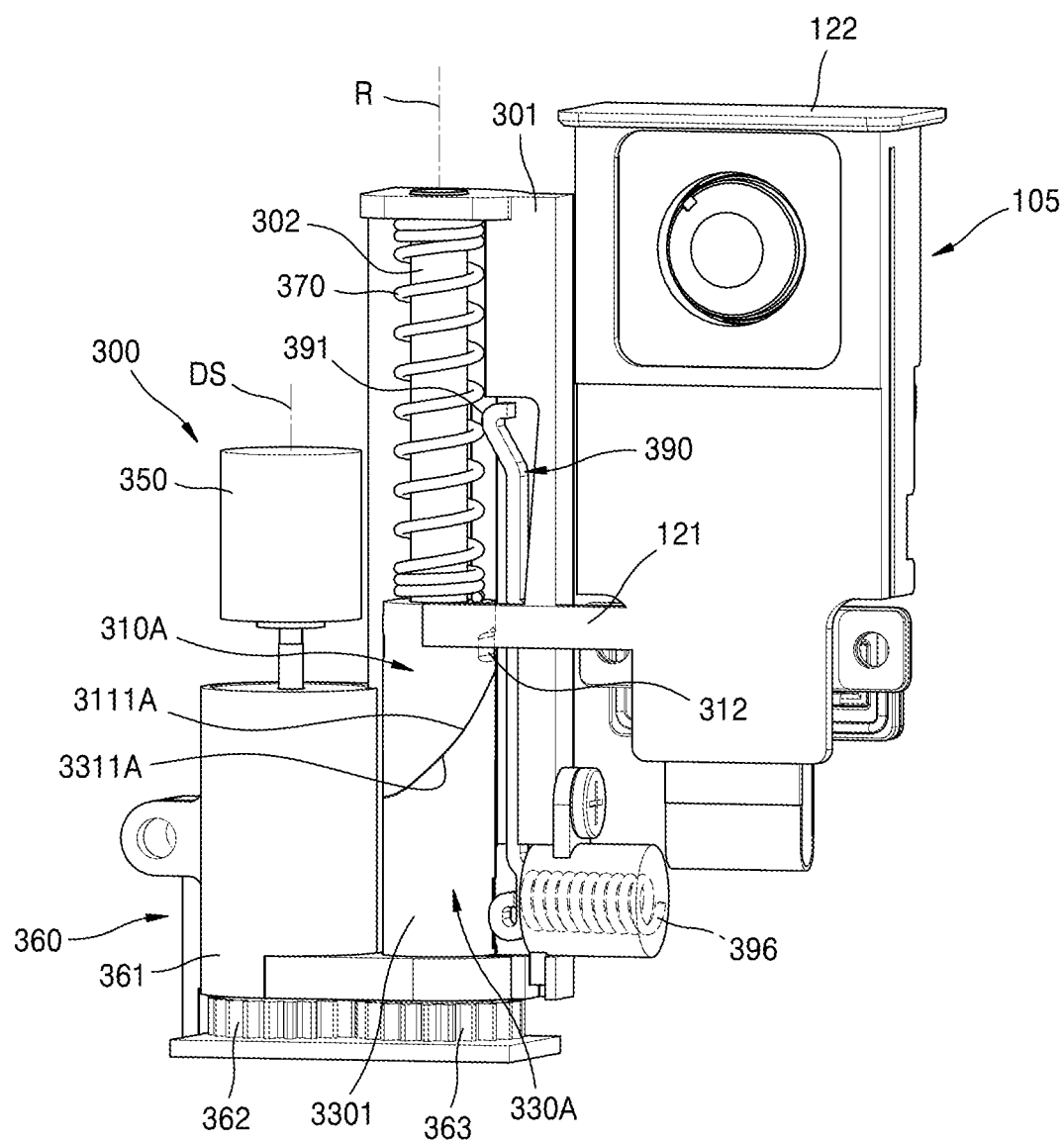
FIG. 10 illustrates a push portion and a camera connection portion according to another embodiment.

However, the first and second press surfaces 3111 and 3311 do not need to be disposed at both side portions of the protruding portion 331 and the recess portion 311, and as illustrated in FIG. 10, a first press surface 3311A may be disposed at only one side portion of the protruding portion 331, and a second press surface 3111A may be disposed at only one side portion of the recess portion 311.

Referring back to FIGS. 6 and 7, the push portion 330 may rotate around a rotation axis R. The rotation axis R of the push portion 330 may be coaxial with an extended direction of the guide shaft 302.

The push portion 330 may be fixed to the guide shaft 302. The guide shaft 302 and the push portion 330 may be installed to be rotatable with respect to the base 301. Accordingly, the push portion 330 may be rotated with the guide shaft 302. However, the push portion 330 does not need to be fixed to the guide shaft 302, and as necessary, while the guide shaft 302 is not rotated, the push portion 330 may be rotated with respect to the guide shaft 302.

The restoring member 370 may provide an elastic force to press the camera connection portion 310 so that the camera connection portion 310 may return to the first position 310-1 from the second position 310-2.

The restoring member 370 may be disposed between the base 301 and the camera connection portion 310 in the movement direction of the camera connection portion 310.

The restoring member 370 may include a coil spring. The restoring member 370 may be disposed to surround the guide shaft 302. However, the type and the arrangement of the restoring member 370 are not limited to the above descriptions, and as necessary, the type and the arrangement thereof may be changed.

The drive module 350 may provide a rotational driving force to the push portion 330. The drive module 350 may be disposed such that a driving shaft DS is spaced apart from the rotation axis R of the push portion 330.

A driving force transfer portion 360 may be disposed between the drive module 350 and the push portion 330. A deceleration gear portion 361, a first gear 362, and a second gear 363 may be disposed in the driving force transfer portion 360. The driving force of the drive module 350 is transferred to the second gear 363 via the deceleration gear portion 361 and the first gear 362, and as the second gear 363 rotates in a first or second direction, the push portion 330 may rotate in the first or second direction.

The deceleration gear portion 361 transfers the driving force of the drive module 350 to the push portion 330 by reducing a rotation speed of the drive module 350. Accordingly, the effect of a small rotation of the drive module 350 on the push portion 330 may be prevented by the deceleration gear portion 361.

Figure 11:
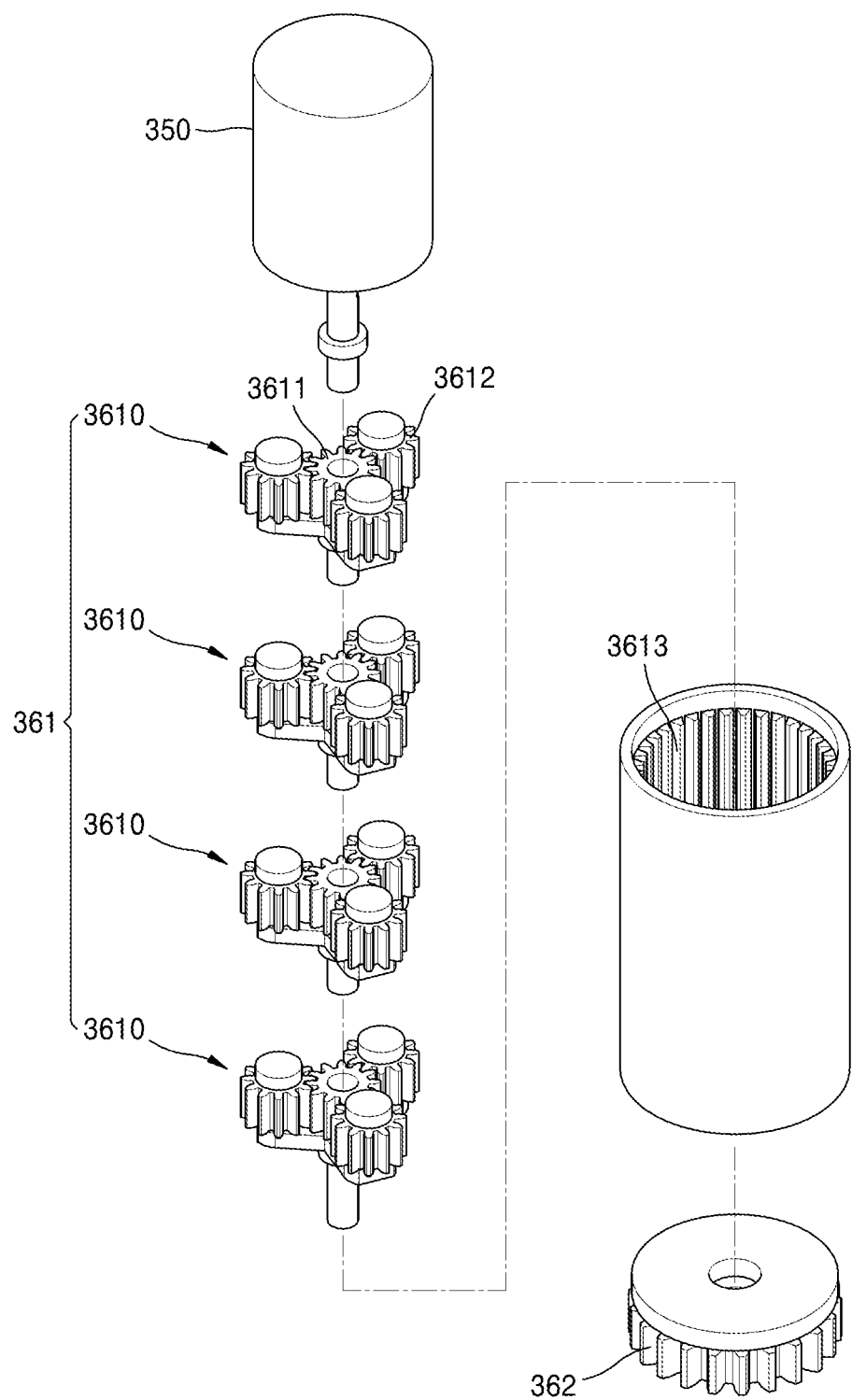
FIG. 11 is a disassembled perspective view of a deceleration gear according to an embodiment.

FIG. 11 is a disassembled perspective view of the deceleration gear portion 361 according to an embodiment. Referring to FIG. 11, the deceleration gear portion 361 may include a plurality of planetary gear rows 3610. Each of the planetary gear rows 3610 may include a sun gear 3611, a plurality of planetary gears 3612 disposed around the sun gear 3611, and a ring gear 3613 disposed around the planetary gears 3612.

As such, as the planetary gear rows 3610 are included, operational noise due to the deceleration gear portion 361 and an installation space therefor may be reduced.

Referring back to FIGS. 7 and 9, the locking portion 390 may restrict a position movement of the camera connection portion 310 when the camera connection portion 310 reaches the second position 310-2.

When the camera connection portion 310 moves to the second position 310-2, the locking portion 390 may press the camera connection portion 310 in a direction crossing the movement direction of the camera connection portion 310. Accordingly, even when the force applied by the push portion 330 to the camera connection portion 310 is removed, unless there is any additional external force or additional motion, the camera connection portion 310 may be restricted from returning to the first position 310-1 from the second position 310-2.

A position restriction recess 312 may be formed in a side surface of the camera connection portion 310. When the camera connection portion 310 is located at the second position 310-2, a position restriction protrusion 391 of the locking portion 390 is inserted into the position restriction recess 312. Accordingly, the camera connection portion 310 may be maintained at the second position 310-2.

The controller may control the drive module 350 such that the push portion 330 may be separated from the camera connection portion 310 when the camera connection portion 310 is maintained at the second position 310-2.

For example, the controller may control the drive module 350 to rotate the push portion 330 in the second direction, for example, in the clockwise direction, so that the protruding portion 331 of the push portion 330 is vertically aligned with the recess portion 311 of the camera connection portion 310.

In the above-described embodiment, a case in which the position restriction recess 312 is disposed in the camera connection portion 310 and the position restriction protrusion 391 is disposed in the locking portion 390 is mainly described as an example, the arrangement of the position restriction recess 312 and the position restriction protrusion 391 is not limited thereto. For example, although not illustrated, the position restriction recess 312 may be disposed in the locking portion 390, and the position restriction protrusion 391 may be disposed in the camera connection portion 310.

In the following description, the operation of the camera movement assembly 300 as described above is described.

FIGS. 12A to 12D illustrate that the camera connection portion 310 is moved from the first position 310-1 to the second position 310-2 and then maintained at the second position 310-2 in the camera movement assembly 300 according to an embodiment.

Figure 12A:
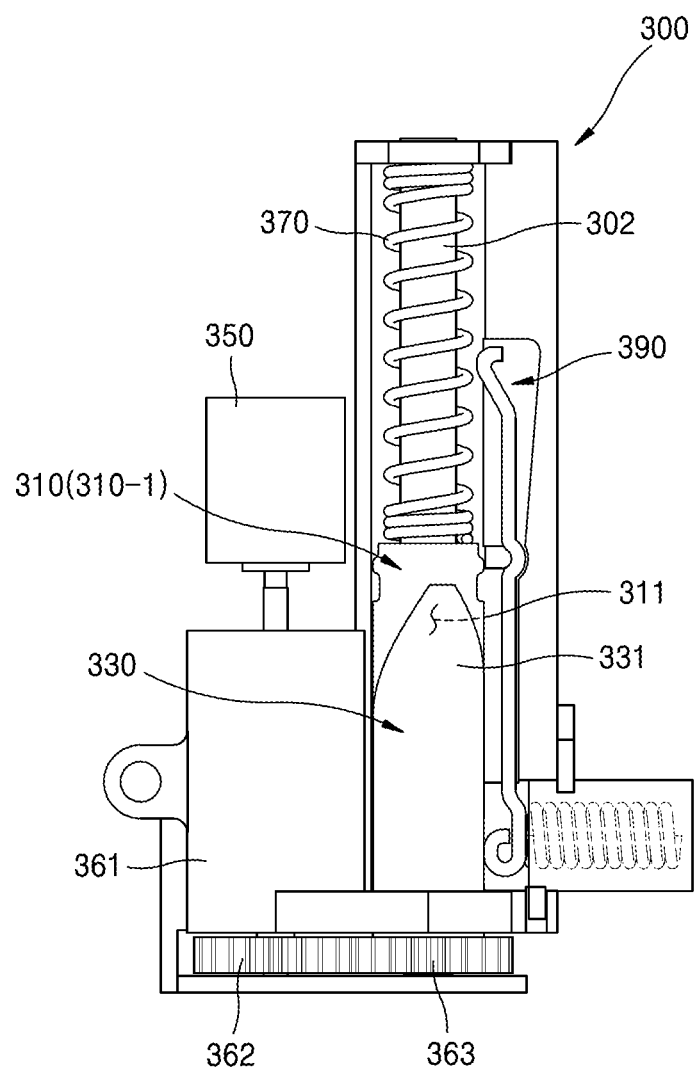
FIGS. 12A to 12D illustrate that the camera connection portion is moved from a first position to a second position and then maintained at the second position in the camera movement assembly according to an embodiment.

Referring to FIG. 12A, the camera connection portion 310 is pressed by the restoring member 370 in a direction approaching the push portion 330. The camera connection portion 310 pressed by the restoring member 370 comes to contact with the push portion 330. The protruding portion 331 of the push portion 330 is inserted into the recess portion 311 of the camera connection portion 310. In this state, in the electronic device 100, the camera module 105 is stored in the housing 110 as illustrated in FIG. 4. The camera connection portion 310 is located at the first position 310-1.

Figure 12B:
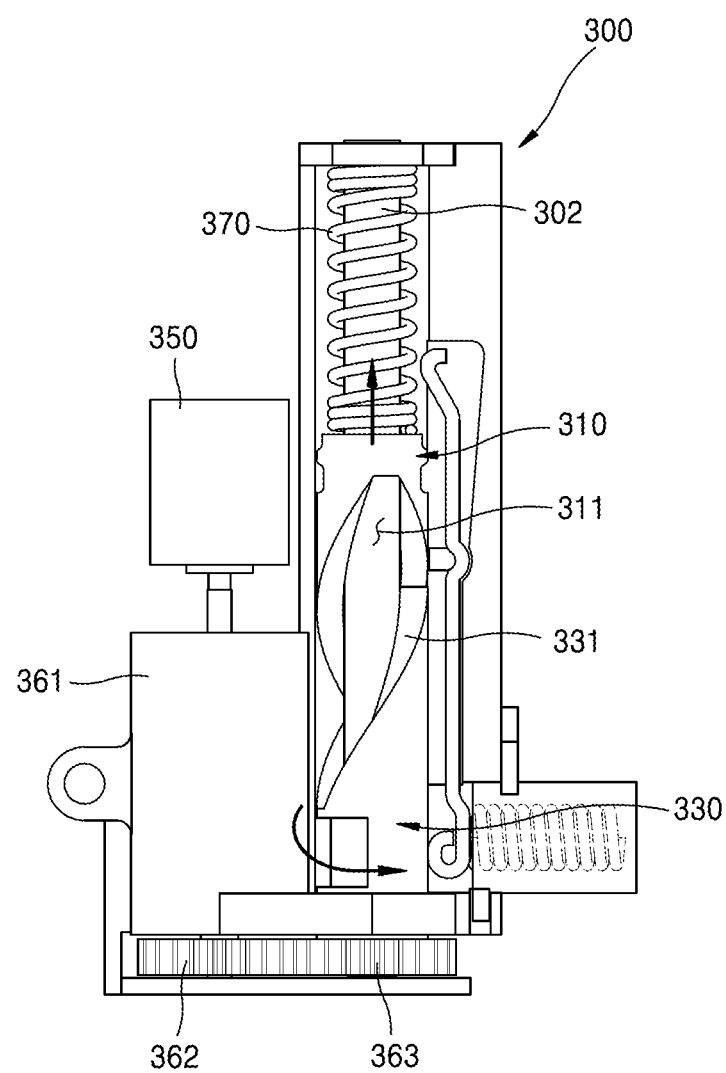

Referring to FIG. 12B, when the drive module 350 operates, the driving force of the drive module 350 is transferred to the push portion 330 via the deceleration gear portion 361, the first gear 362, and the second gear 363.

As the drive module 350 rotates in the clockwise direction, the first gear 362 rotates in the clockwise direction, the second gear 363 linked with the first gear 362 and the push portion 330 connected to the second gear 363 are accordingly rotated in the counterclockwise direction.

As the push portion 330 rotates, the first press surface 3311 pushes the second press surface 3111, and thus the camera connection portion 310 is moved along the guide shaft 302.

Figure 12C:
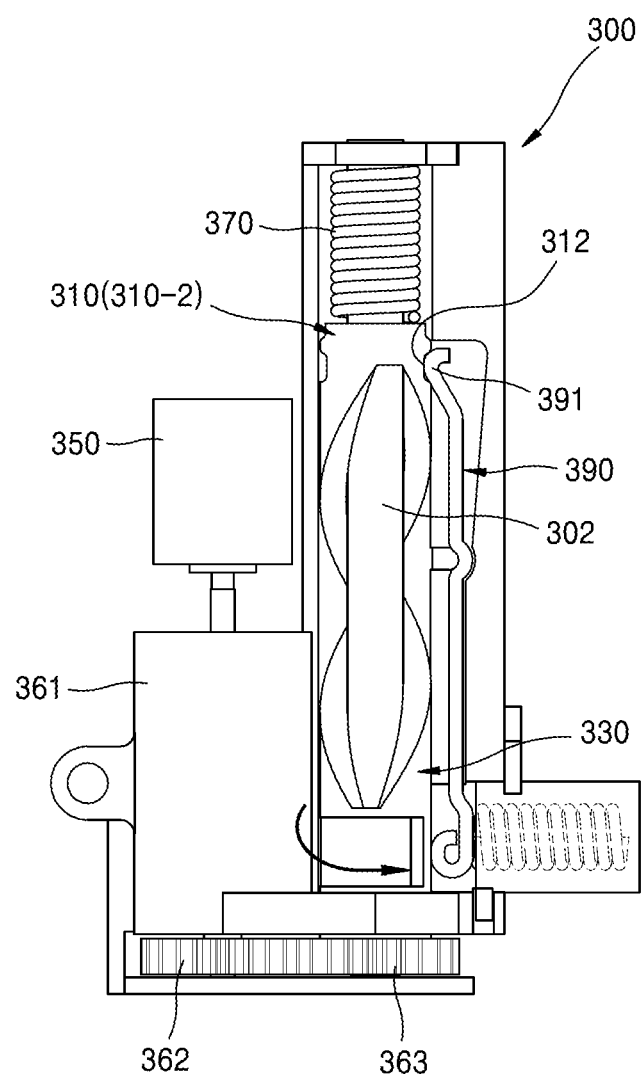

Referring to FIG. 12C, the camera connection portion 310 is moved to the second position 310-2.

In a movement process of the camera connection portion 310, a contact position of the first press surface 3311 and the second press surface 3111 is changed, and a contact area between the first press surface 3311 and the second press surface 3111 decreases.

When the camera connection portion 310 reaches the second position 310-2, the position restriction protrusion 391 of the locking portion 390 is inserted into the position restriction recess 312 of the camera connection portion 310. Accordingly, the camera connection portion 310, which is elastically pressed by the restoring member 370, may be maintained at the second position 310-2.

Figure 12D:
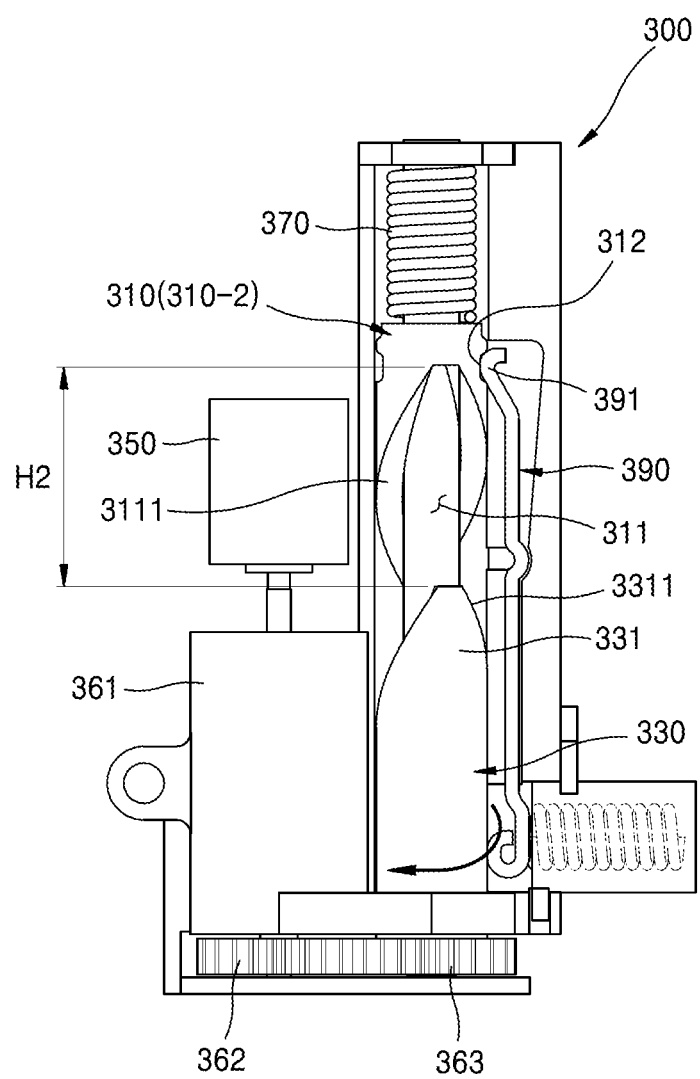

Referring to FIG. 12D, while the camera connection portion 310 is maintained by the locking portion 390 at the second position 310-2, the controller may rotate the push portion 330 such that the push portion 330 is separated from the camera connection portion 310.

The controller may control the drive module 350 to rotate in a direction opposite to the direction in which the push portion 330 pushes the camera connection portion 310. For example, the controller may control the drive module 350 to rotate in the counterclockwise direction. The driving force of the drive module 350 is transferred to the first gear 362 via the deceleration gear portion 361 and rotates the first gear 362 in the counterclockwise direction. Accordingly, the second gear 363 linked with the first gear 362 and the push portion 330 connected to the second gear 363 are rotate in the clockwise direction.

In an example, the controller may control the push portion 330 such that the protruding portion 331 is vertically aligned with the recess portion 311.

As the camera connection portion 310 is located at the second position 310-2 and maintained by the locking portion 390 at the position, even when the push portion 330 rotates in the second direction, the second press surface 3111 of the camera connection portion 310 is not moved. Accordingly, as the push portion 330 rotates in the second direction, the first press surface 3311 is separated away from the second press surface 3111. The push portion 330 and the camera connection portion 310 located at the second position 310-2 are separated from each other. In this state, in the electronic device 100, the camera module 105 protrudes out of the housing 110 as illustrated in FIG. 5.

Referring to FIGS. 5 and 12D, when the camera module 105 protrudes out of the housing 110, the camera connection portion 310 is maintained by the locking portion 390 at the second position 310-2, and a space exists between the camera connection portion 310 and the push portion 330. When the camera connection portion 310 is located at the second position 310-2, a height H2 of the space may be ½ or more of a protrusion height H1 of the camera module 105. Considering the size of the electronic device 100, the height H2 of the space may be equal to or less than two times of the protrusion height H1 of the camera module 105.

Figure 13A:
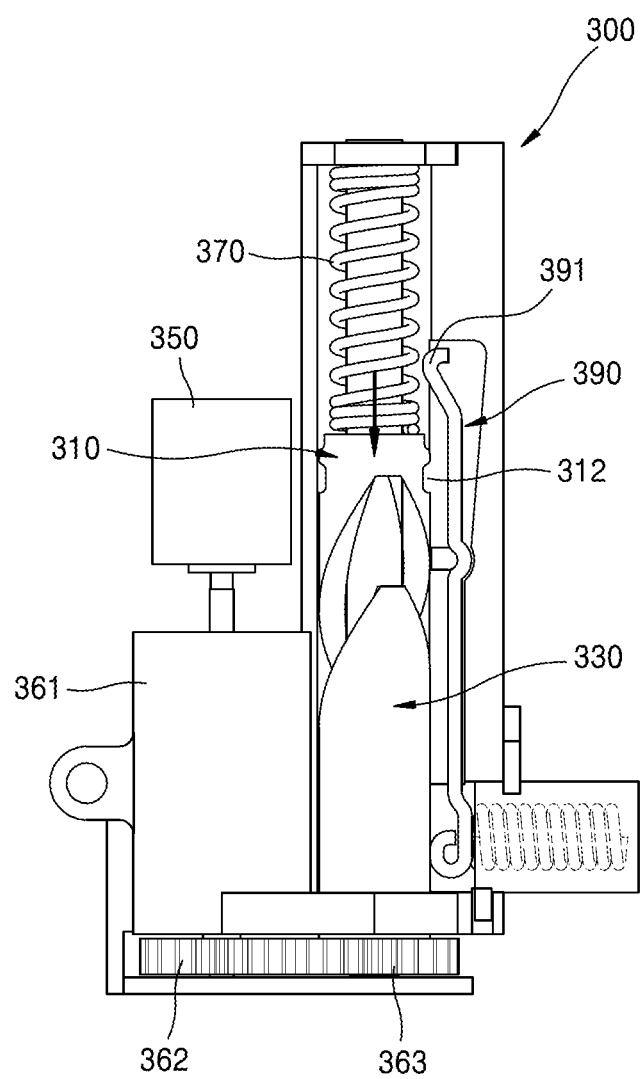
FIGS. 13A and 13B illustrate an operation of the camera connection portion when position restriction by a locking portion is removed.
Figure 13B:
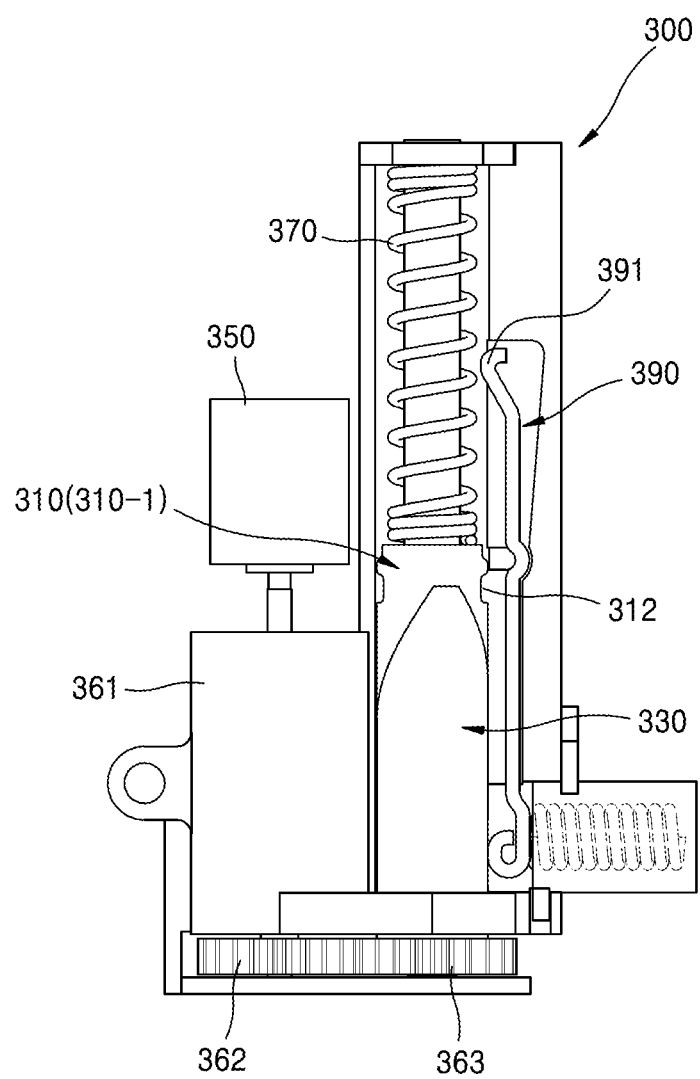

FIGS. 13A and 13B illustrate an operation of the camera connection portion 310 when the position restriction by the locking portion 390 is removed.

Referring to FIGS. 13A and 13B, as the camera connection portion 310 and the push portion 330 are separated from each other, a space exists between the camera connection portion 310 and the push portion 330. Accordingly, when the position restriction by the locking portion 390 is removed, the camera connection portion 310, with no interference by other members, may be moved by the restoring member 370 to the space between the camera connection portion 310 and the push portion 330 so as to return to the first position 310-1. The camera module 105 connected to the camera connection portion 310 may return to the stored position 105-1.

As such, in the electronic device 100 according to an embodiment, with only an operation of removing the position restriction by the locking portion 390, the camera module 105 may be moved to the stored position 105-1.

In an example, when a user directly presses the camera module 105 with a force merely to remove the position restriction by the locking portion 390, the camera module 105 may be drawn into the housing 110. In other words, the electronic device 100 according to an embodiment, the camera module 105 may be manually drawn into the housing 110.

In another example, even when the user presses the camera module 105 with a force less than the force to remove the position restriction by the locking portion 390, the controller may control the position restriction by the locking portion 390 to be removed by detecting the force, the camera module 105 may be drawn into the housing 110. In other words, in the electronic device 100 according to an embodiment, the camera module 105 may be semi-automatically drawn into the housing 110. In this case, the camera module 105 may further include a sensor for detecting a user's force. As an example of a sensor, an acceleration sensor or a pressure sensor may be employed.

In another example, even when no force is applied by the user, the controller may control to remove the position restriction by the locking portion 390 by detecting a certain situation, the camera module 105 may be drawn into the housing 110. In other words, in the electronic device 100 according to an embodiment, the camera module 105 may be automatically drawn into the housing 110. In this case, the camera module 105 may further include a sensor for detecting a certain situation. As an example of a sensor, a gravity sensor for detecting falling of the camera module 105 or the electronic device 100 including the same may be employed.

Figure 14:
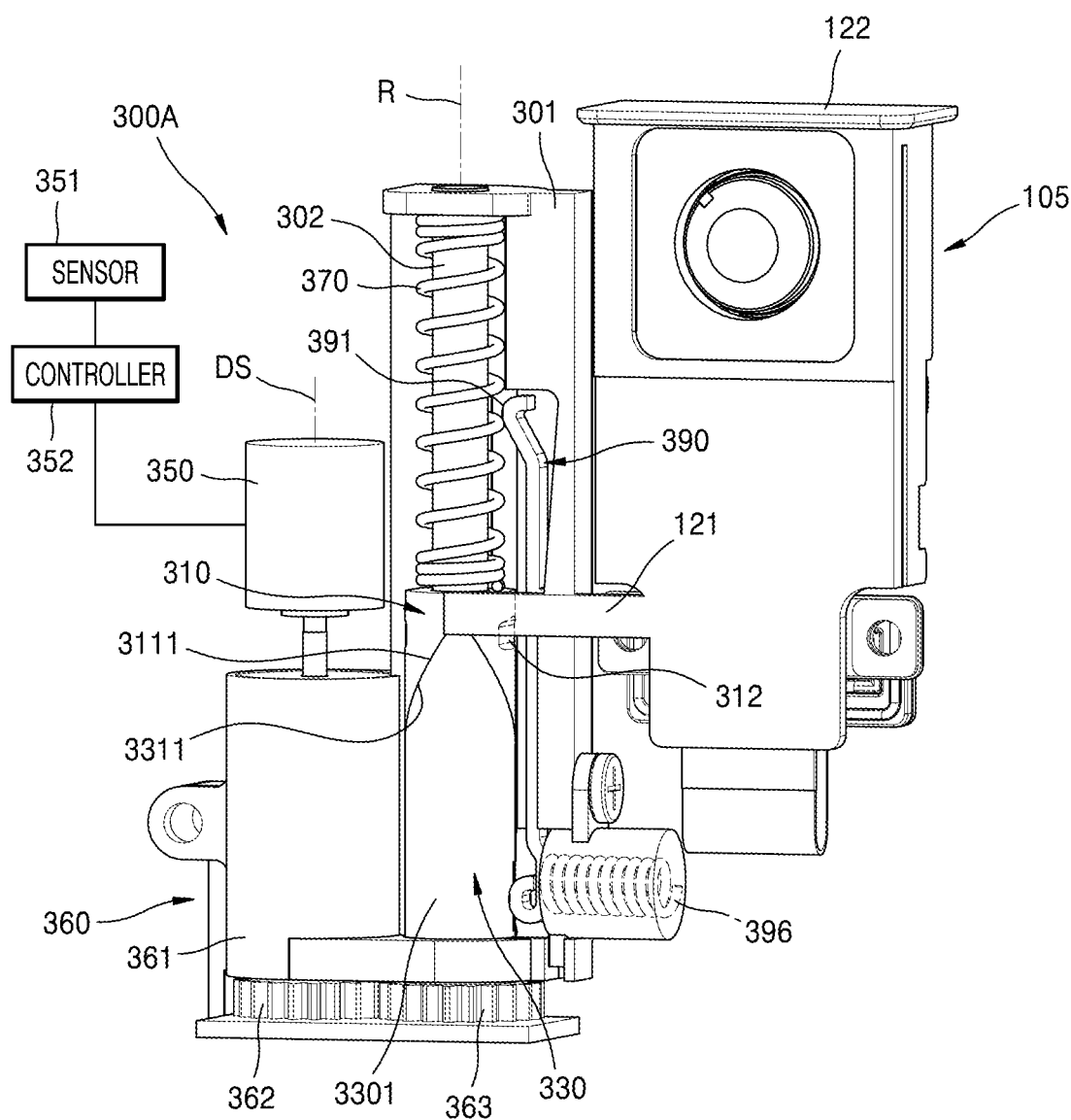
FIG. 14 illustrates a camera movement assembly according to another embodiment.

FIG. 14 illustrates a part of a camera movement assembly 300A according to another embodiment. For example, referring to FIG. 14, the camera movement assembly 300A may include a gravity sensor 351, and a controller 352 may move the camera module 105 to the stored position 105-1 based on a result of the detection by the gravity sensor 351.

As an example of the gravity sensor 351, at least one of an acceleration sensor, a barometric pressure sensor, a geomagnetic sensor, and a grip sensor may be used. However, the type of the gravity sensor 351 is not limited thereto, and a variety of sensors capable of detecting falling of the electronic device 100 may be used therefor.

When a user drops the electronic device 100, the gravity sensor 351 may detect the falling, and the controller 352 may remove the position restriction by the locking portion 390 based on a result of the detection by the gravity sensor 351 and move the camera module 105 to the stored position 105-1. Accordingly, even when the electronic device 100 is dropped while the camera module 105 protrudes out of the electronic device 100, the electronic device 100 automatically moves the camera module 105 to the stored position 105-1, thereby preventing damage of the camera module 105.

In order for the electronic device 100 to semi-automatically or automatically draw the camera module 105 into the housing 110, the electronic device 100 may include a structure of quickly removing the position restriction by the locking portion 390. For example, referring back to FIGS. 6 and 7, the electronic device 100 may have a structure in which the locking portion 390 is linked with a rotation of the push portion 330.

The locking portion 390 may include the position restriction protrusion 391, a connecting rod 392 connected to the position restriction protrusion 391, and a position restoration member 393 connected to the connecting rod 392.

The connecting rod 392 may be capable of rotating around a rotation axis RA and disposed between the position restriction protrusion 391 and the position restoration member 393. The position restriction protrusion 391 and the position restoration member 393 may rotate around the rotation axis RA.

The position restriction protrusion 391 presses a side surface of the camera connection portion 310, and the position restoration member 393 presses the side surface of the push portion 330. The position restoration member 393 presses the side surface of the push portion 330 by an elastic force provided by an elastic member 396.

As the position restriction protrusion 391 and the position restoration member 393 are connected by the connecting rod 392, the position restriction protrusion 391 and the position restoration member 393 rotate together.

For example, when the position restriction protrusion 391 rotates in a direction toward the side surface of the camera connection portion 310, the position restoration member 393 rotates in a direction away from the side surface of the push portion 330. When the position restriction protrusion 391 rotates in a direction away from the side surface of the camera connection portion 310, the position restoration member 393 rotates in a direction toward the side surface of the push portion 330.

A position restoration recess 333 (see FIG. 15B) is disposed in a partial area of the side surface of the push portion 330 in a circumferential direction. The position restoration member 393 may be inserted into the position restoration recess 333.

The side surface of the push portion 330 may include, in the circumferential direction, an insertion region 3302 where the position restoration recess 333 is disposed and a non-insertion region 3301 where the position restoration recess 333 is not disposed.

FIGS. 15A to 15D illustrate an operation of removing the position restriction by the locking portion 390 as the push portion 330 rotates in the camera movement assembly 300 according to an embodiment.

Figure 15A:
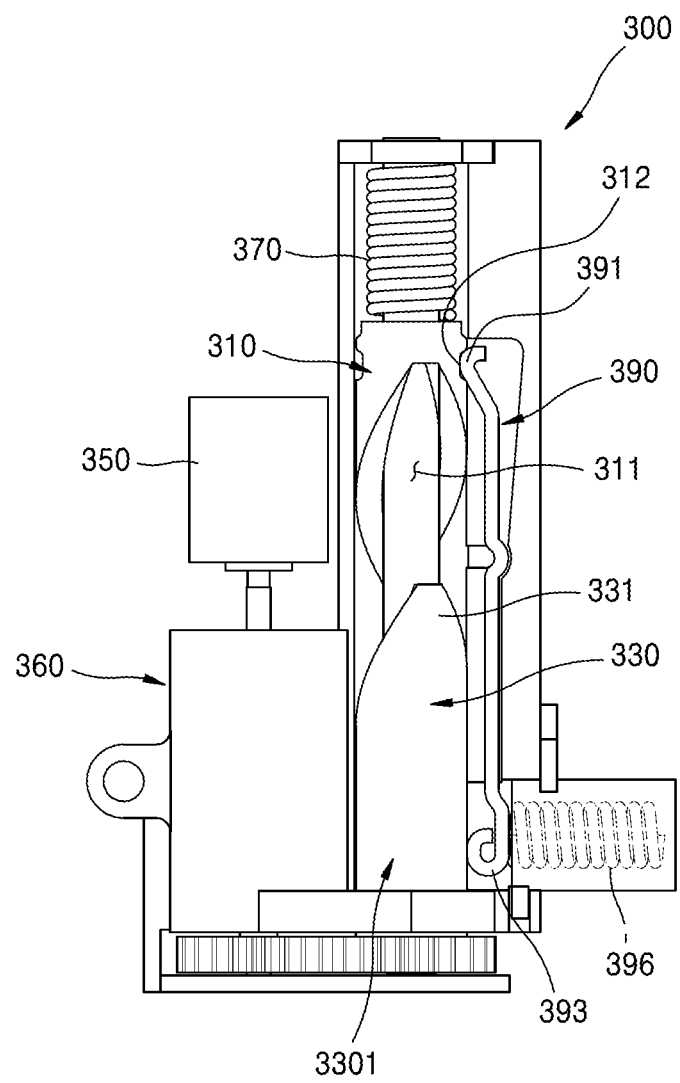
FIGS. 15A to 15D illustrate an operation of removing the position restriction by the locking portion as the push portion rotates in a camera movement assembly according to an embodiment.

Referring to FIG. 15A, the camera connection portion 310 is maintained by the locking portion 390 at the second position 310-2. In this state, the position restriction protrusion 391 is inserted into the position restriction recess 312, and the position restoration member 393 is in contact with the non-insertion region 3301 of the push portion 330. The recess portion 311 of the camera connection portion 310 and the protruding portion 331 of the push portion 330 are vertically aligned with each other.

Figure 15B:
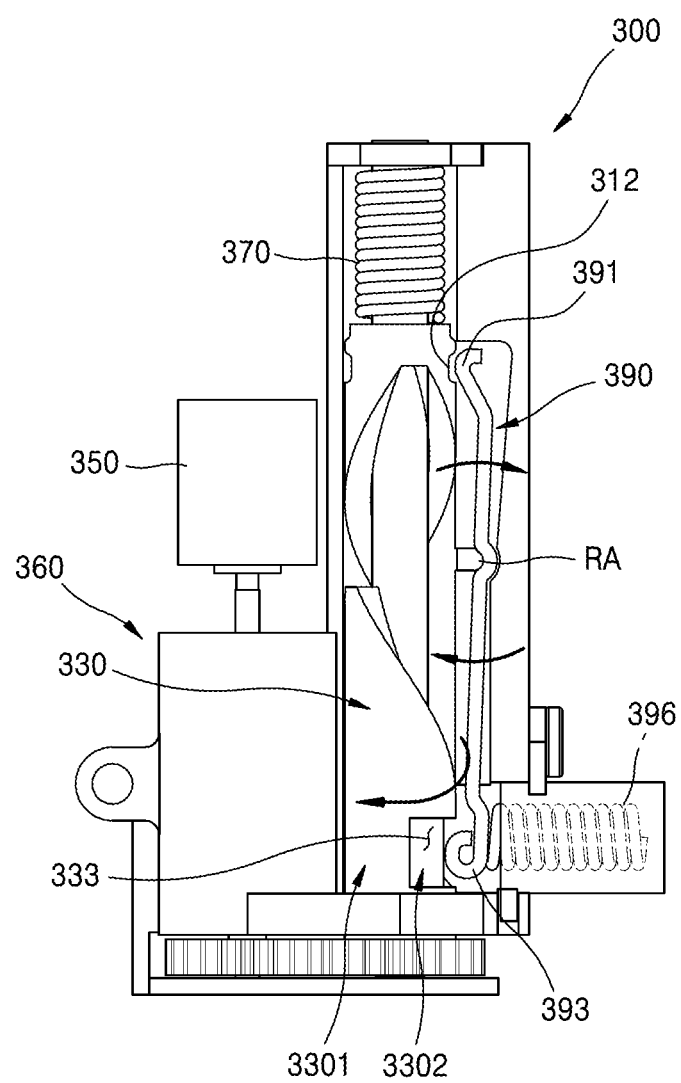

Referring to FIG. 15B, the controller controls the push portion 330 to rotate in the second direction. While the push portion 330 rotates in the second direction, the position restoration member 393 comes to contact with the insertion region 3302 of the push portion 330. In this state, the position restoration member 393 is inserted into the position restoration recess 333. Accordingly, the position restoration member 393 rotates in the direction toward the side surface of the push portion 330, and the position restriction protrusion 391 rotates in the direction away from the side surface of the camera connection portion 310. The position restriction protrusion 391 is pulled out of the position restriction recess 312 of the push portion 330, and the position restriction of the camera connection portion 310 by the locking portion 390 is removed.

Figure 15C:
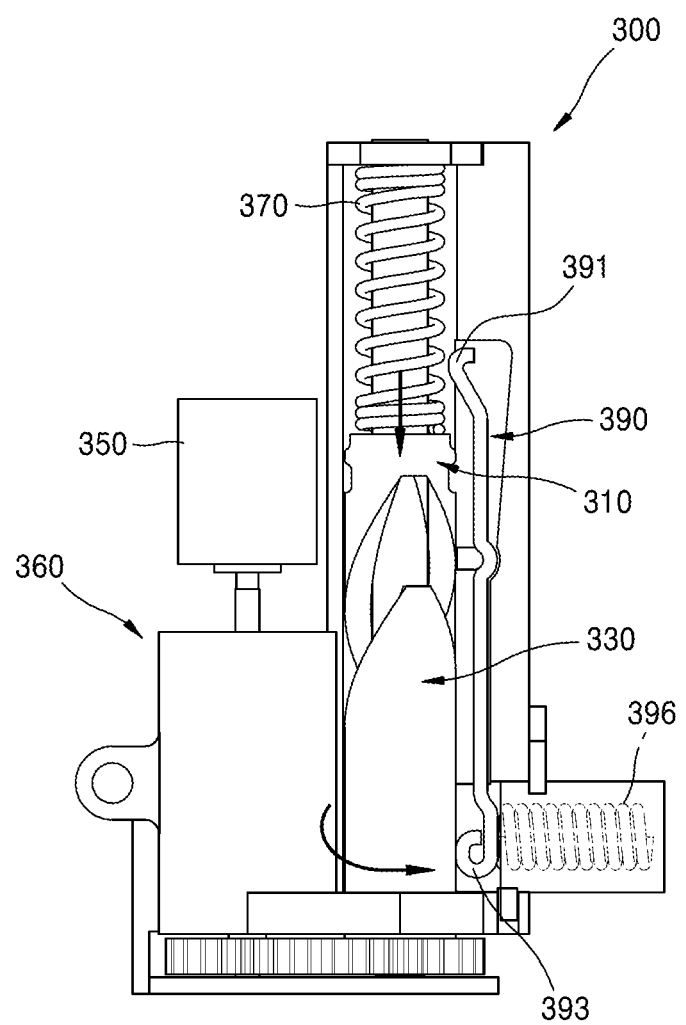
Figure 15D:
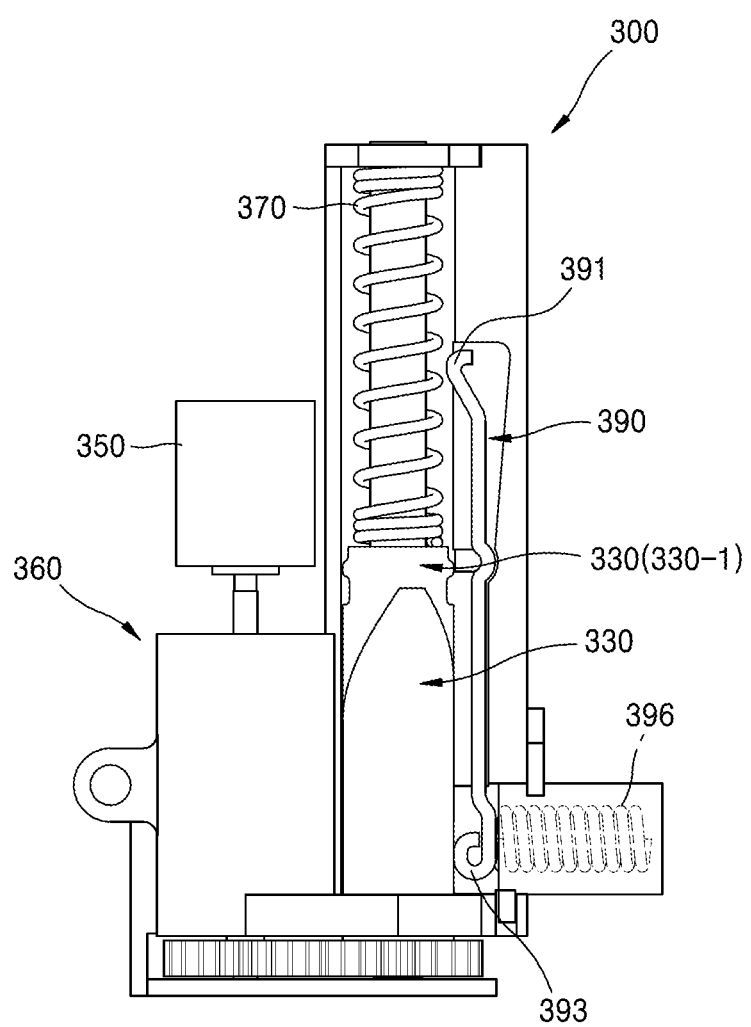

Referring to FIGS. 15C and 15D, as the position restriction of the camera connection portion 310 is removed, the camera connection portion 310 is moved to the first position 310-1 by the elastic force of the restoring member 370. In this state, the controller may rotate the push portion 330 in the first direction such that the protruding portion 331 of the push portion 330 and the recess portion 311 of the camera connection portion 310 are vertically aligned. As the protruding portion 331 of the push portion 330 and the recess portion 311 of the camera connection portion 310 are vertically aligned, the camera connection portion 310 and the push portion 330 may be prevented from interfering with each other when the camera connection portion 310 is restored to the first position 310-1.

As described above, as the electronic device 100 has a structure in which the movement of the position restriction protrusion 391 of the locking portion 390 is linked with the movement of the position restoration member 393 and the movement of the position restoration member 393 is linked with the rotation of the push portion 330, a simple operation of rotating the push portion 330 by the controller may move the position restriction protrusion 391 to be pulled out of the position restriction recess 312. Accordingly, the position restriction of the push portion 330 by the locking portion 390 may be quickly removed, and the camera module 105 may be quickly moved to the stored position 105-1.

As such, as the camera module 105 may be quickly moved to the stored position 105-1, the camera module 105 may be automatically drawn into the housing 110 even in a short moment when the electronic device 100 falls.

However, the removal of the movement restriction of the camera connection portion 310 may not be necessarily linked with the rotation of the push portion 330.

Figure 16:
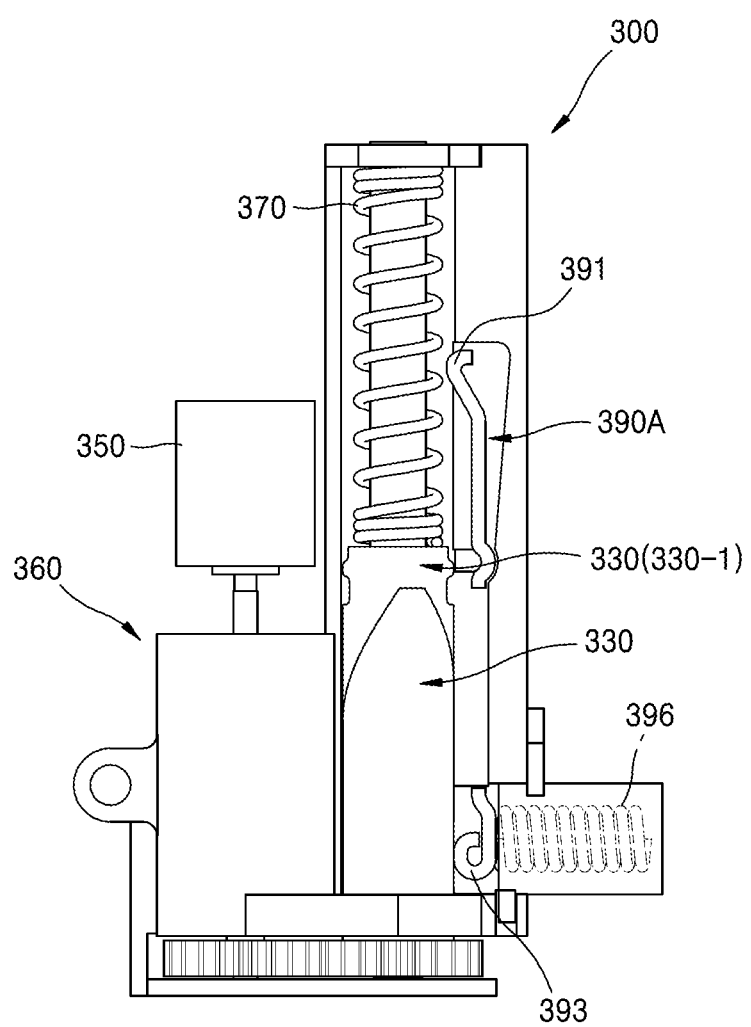
FIG. 16 illustrates a locking portion of a camera movement assembly, according to another embodiment.

FIG. 16 illustrates a locking portion 390A of the camera movement assembly 300, according to another embodiment. For example, as illustrated in FIG. 16, the locking portion 390A of the camera movement assembly 300 may remove the movement restriction of the camera connection portion 310 regardless of the rotation of the push portion 330.

Figure 17A:
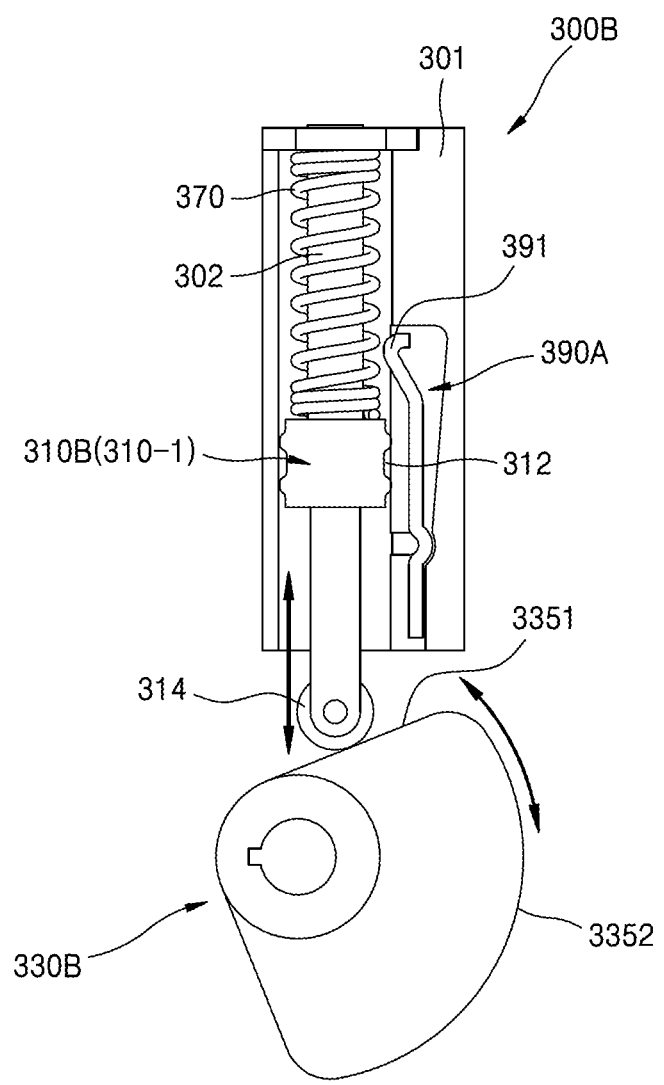
FIGS. 17A and 17B illustrate a camera movement assembly according to another embodiment.
Figure 17B:
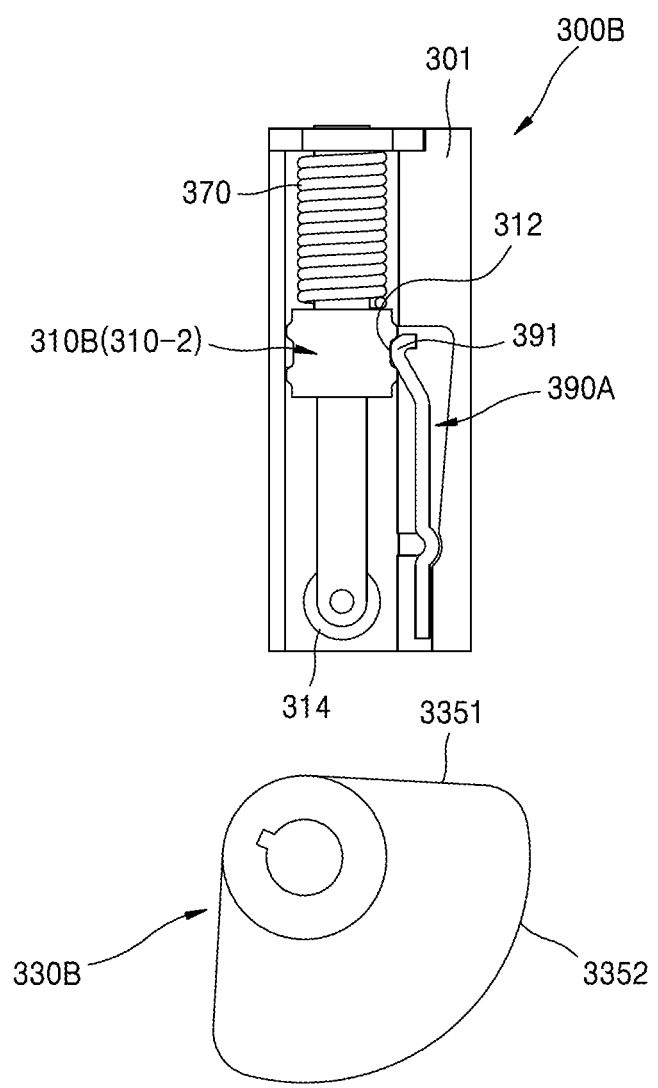

FIGS. 17A and 17B illustrate a camera movement assembly 300B according to another embodiment.

Referring to FIGS. 17A and 17B, as another embodiment, a push portion 330B may rotate around a rotation axis extending in a direction perpendicular to a movement direction of a camera connection portion 310B.

The radius of rotation of the push portion 330B may vary according to positions. For example, the push portion 330B may include a first region 3351 in which the radius of rotation increases and a second region 3352 in which the radius of rotation remains constant.

A roller 314 may be disposed at an end portion of the camera connection portion 310B. The push portion 330B may be in contact with the roller 314 of the camera connection portion 310B.

When the push portion 330B rotates in the first direction, the roller 314 of the camera connection portion 310B comes to contact with the first region 3351, and the camera connection portion 310B is moved by the push portion 330B from the first position 310-1 to the second position 310-2.

When the camera connection portion 310B is maintained at the second position 310-2, as the push portion 330B is rotated in the second direction, the camera connection portion 310B and the push portion 330B may be separated from each other.

Although an example of a structure in which the push portion 330B rotates is mainly described in the above-described embodiments, the present disclosure is not limited thereto. For example, the push portion 330B may perform a linear motion in a direction different from a movement direction of the camera connection portion 310B.

Figure 18A:
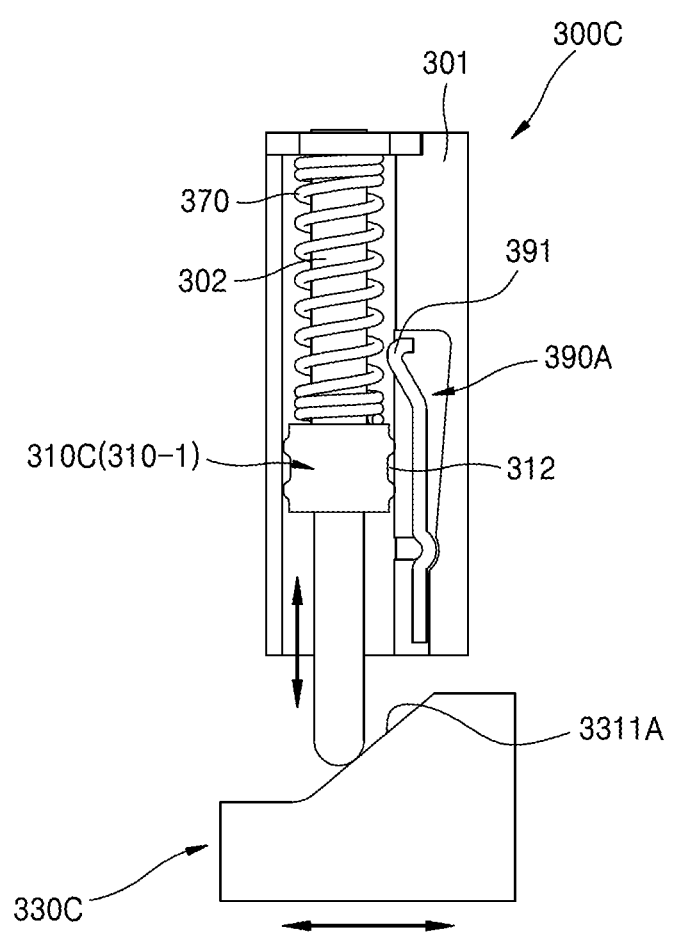
FIGS. 18A and 18B illustrate a camera movement assembly according to another embodiment.
Figure 18B:
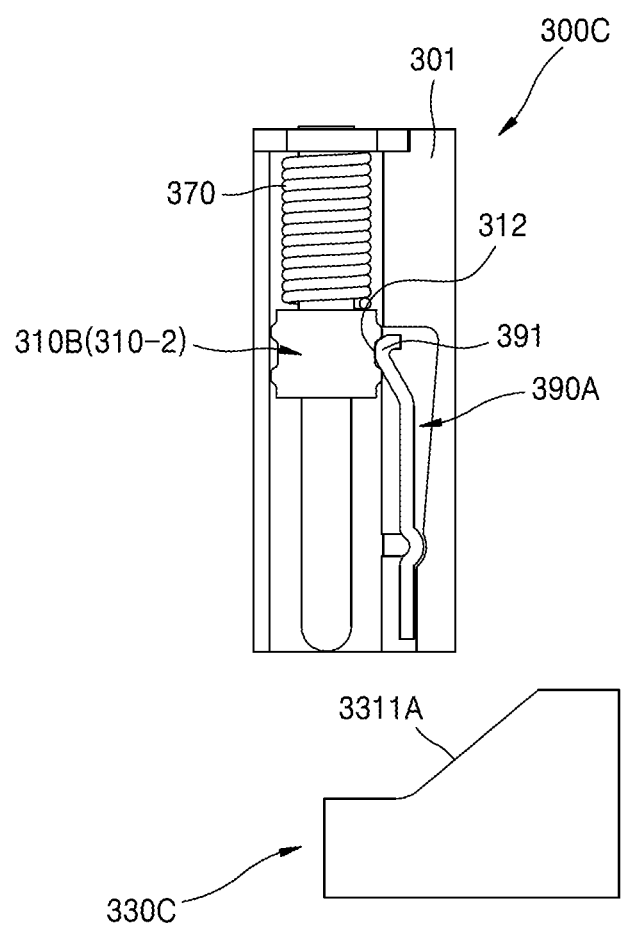

FIGS. 18A and 18B illustrate a camera movement assembly 300C according to another embodiment.

Referring to FIGS. 18A and 18B, a push portion 330C may perform a linear motion in a direction crossing a movement direction of a camera connection portion 310C.

The push portion 330C may have a press surface 3311A that is arranged in a region corresponding to be the camera connection portion 310C to be inclined to a movement direction of the camera connection portion 310C. The height of the press surface 3311A may vary according to a movement direction of the push portion 330C.

As the push portion 330C moves in the first direction, for example, the leftward direction, the camera connection portion 310C may ascend by being pushed by the press surface 3311A of the push portion 330C having a different height.

When the camera connection portion 310C is maintained at a position by a locking portion 390C and the push portion 330C is moved in the second direction, in the rightward direction, the push portion 330C and the camera connection portion 310C are separated from each other.

In the above-described embodiments, although an example in which the camera movement assembly 300 moves the camera module 105 between the inside and the outside of the electronic device 100 is mainly described, the camera movement assembly 300 may be used to move a functional module other than the camera module 105.

For example, a functional module 400 moving between the inside and the outside of an electronic device 100A may be the audio module 114 and the sensor module 104. In this case, the camera movement assembly 300 may be referred to as a functional module movement assembly 300D, and the camera connection portion 310 may be referred to as a functional module connection part 310D.

Figure 19:
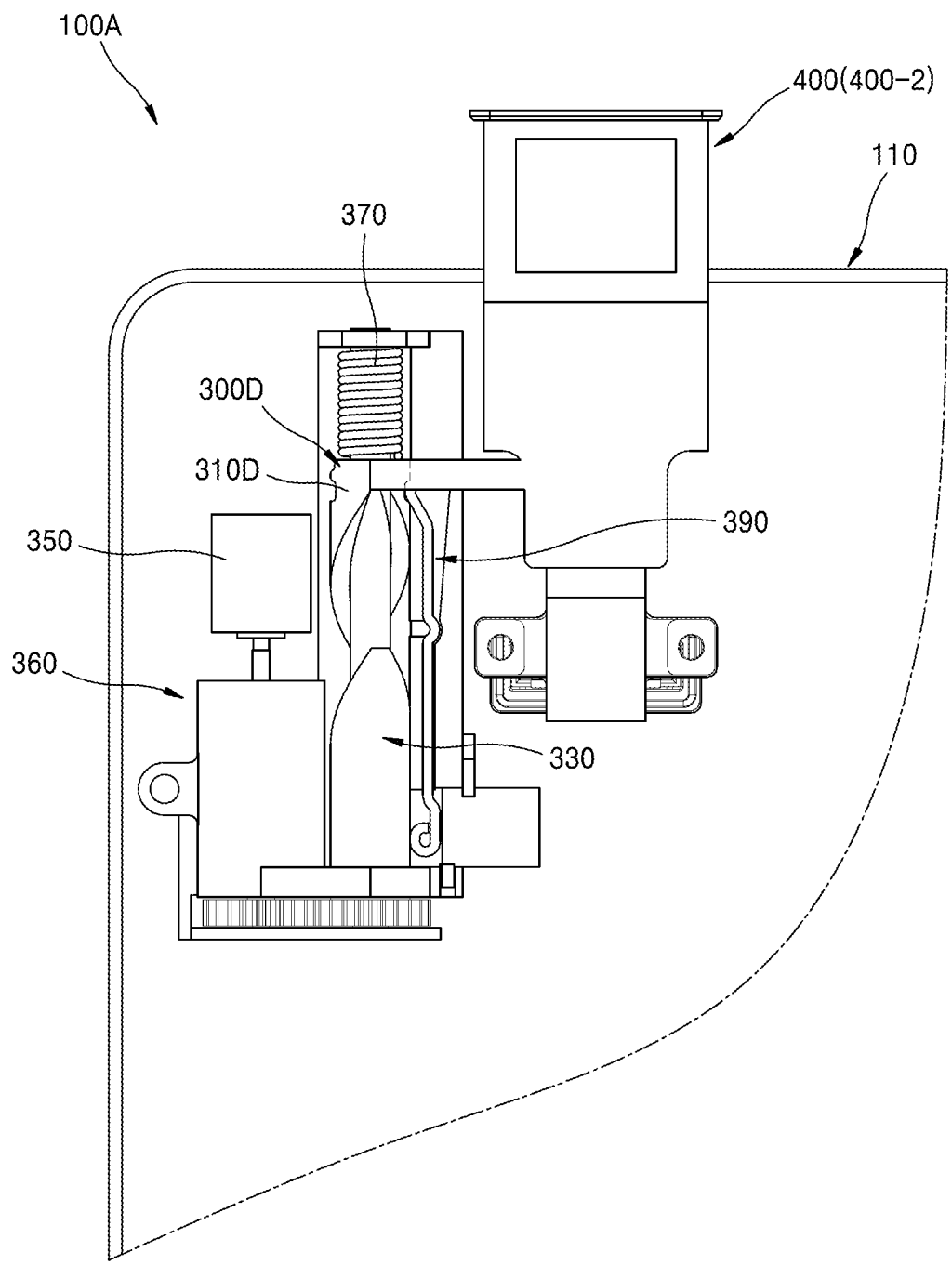
FIG. 19 schematically illustrates a part of an electronic device according to another embodiment.

For example, as illustrated in FIG. 19, the functional module movement assembly 300D is connected to the functional module 400 and may move the functional module 400 from a stored position to a protruding position 400-2. The functional module movement assembly 300D may include the functional module connection part 310D, the push portion 330, the drive module 350, the restoring member 370, and the locking portion 390.

While the present disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present disclosure as defined by the following claims.

The invention claimed is:

1. An electronic device comprising:
    a housing;
    a camera module; and
    a camera movement assembly configured to move the camera module between inside and outside of the housing,
    wherein the camera movement assembly comprises:
    a camera connection portion which has a connection part connected to the camera module and is configured to move between a first position at which the camera module is stored in the housing and a second position at which the camera module protrudes out of the housing;
    a push portion configured to push the camera connection portion from the first position to the second position when the camera connection portion is at the first position and to be separated from the camera connection portion when the camera connection portion is at the second position;
    a restoring member configured to provide a restoration force to the camera connection portion to return the camera connection portion from the second position to the first position; and
    a locking portion configured to restrict a position movement of the camera connection portion when the camera connection portion is at the second position,
    wherein, when the camera module protrudes out of the housing, the camera connection portion is maintained by the locking portion at the second position, and a space exists between the camera connection portion and the push portion, and
    wherein, when the camera connection portion is located at the second position, a height of the space is equal to or greater than ½ of a protrusion height of the camera module.

2. The electronic device of claim 1, wherein the push portion is rotatable in a first direction and a second direction that is opposite to the first direction,
    when the camera connection portion is at the first position, the push portion rotates in the first direction and pushes the camera connection portion to move from the first position to the second position, and
    when the camera connection portion is at the second position, the push portion rotates in the second direction and is separated from the camera connection portion which is maintained by the locking portion at the second position.

3. The electronic device of claim 2, wherein the push portion has a first press surface facing the camera connection portion, and
    the camera connection portion has a second press surface facing the first press surface.

4. The electronic device of claim 3, wherein the push portion comprises a protruding portion protruding toward the camera connection portion, wherein the first press surface is disposed at at least one side of the protruding portion, and
    the camera connection portion comprises a recess portion into which the protruding portion is inserted, wherein the second press surface is disposed at at least one side of the recess portion.

5. The electronic device of claim 4, wherein, when the camera connection portion is located at the second position, the push portion rotates in the second direction such that the protruding portion is aligned with the recess portion of the camera connection portion in a movement direction of the camera connection portion.

6. The electronic device of claim 2, wherein, when the camera connection portion is located at the second position, the locking portion presses the camera connection portion in a direction crossing a movement direction of the camera connection portion.

7. The electronic device of claim 6, wherein the locking portion is configured to remove a movement restriction of the camera connection portion according to a rotation of the push portion.

8. The electronic device of claim 7, wherein the locking portion comprises:
a position restriction protrusion which presses a side surface of the camera connection portion;
a position restoration member which presses a side surface of the push portion; and
a connecting rod which connects the position restriction protrusion to the position restoration member and rotates around a rotation axis.

9. The electronic device of claim 8, wherein a position restriction recess into which the position restriction protrusion is inserted is provided at the side surface of the camera connection portion,
a position restoration recess into which the position restoration member is inserted is provided in a partial region in a circumferential direction in the side surface of the push portion, and
the electronic device further comprising an elastic member which provides an elastic force to the position restoration member so that the position restoration member presses the side surface of the push portion.

10. The electronic device of claim 2, wherein the push portion is rotatable around a rotation axis coaxial with a movement direction of the camera connection portion.

11. The electronic device of claim 1, further comprising:
a drive module configured to provide a driving force to the push portion; and
a deceleration gear portion disposed between the drive module and the push portion,
wherein the deceleration gear portion comprises a planetary gear row.

12. The electronic device of claim 1, wherein the push portion linearly moves in a direction crossing a movement direction of the camera connection portion.

13. The electronic device of claim 1, wherein the connection part is integrally formed with the camera connection portion.

14. The electronic device of claim 1, further comprising:
a sensor configured to detect falling of the electronic device; and
a controller configured to move the camera module to be stored in the housing based on a result of the detection by the sensor.

15. The electronic device of claim 14, wherein the controller is further configured to move the camera module by removing a movement restriction of the camera connection portion by the locking portion based on the result of the detection by the sensor.

* * * * *